United States Patent [19]
Hall, III et al.

[11] Patent Number: 5,712,898
[45] Date of Patent: Jan. 27, 1998

[54] D4 CHANNEL BANK WITH MULTI-MODE FORMATTED, PERFORMANCE-MONITORING COMMUNICATION BUS

[75] Inventors: Clifford L. Hall, III, Huntsville; Scott C. Bailey, Harvest; Jeffrey B. Wells, Madison, all of Ala.

[73] Assignee: Adtran, Inc., Huntsville, Ala.

[21] Appl. No.: 404,288

[22] Filed: Mar. 14, 1995

Related U.S. Application Data

[63] Continuation-in-part of Ser. No. 27,948, Mar. 8, 1993, Pat. No. 5,473,665.

[51] Int. Cl.$^6$ .................... H04M 3/08; H04M 3/22
[52] U.S. Cl. .................. 379/29; 379/10; 379/15; 379/27; 379/33; 379/34
[58] Field of Search .................. 379/5, 9, 10, 15, 379/27, 29, 32, 33, 34; 370/13, 15, 241, 249

[56] References Cited

U.S. PATENT DOCUMENTS

| | | | |
|---|---|---|---|
| 4,641,299 | 2/1987 | Kemper | 370/15 |
| 5,018,184 | 5/1991 | Abrams | 379/27 |
| 5,054,050 | 10/1991 | Burke | 379/29 |
| 5,208,803 | 5/1993 | Conforti | 379/29 |
| 5,495,576 | 2/1996 | Lee | 379/10 |

*Primary Examiner*—Curtis Kuntz
*Assistant Examiner*—Vijay Shankar
*Attorney, Agent, or Firm*—Charles E. Wands

[57] ABSTRACT

A performance monitoring arrangement conducts auxiliary in-band communications between a line interface unit and one or more channel units of a D4 channel bank without interrupting transmission of digital data to and from a customer premises. During a first, initialization mode of operation, and a second, smart performance-monitoring mode, the data communication format of a channel bank RNPCM bus is modified to allow insertion of an auxiliary line interface unit-sourced command bit between selected bits of the data. During the second mode of operation, the communication format of the channel bank link is further modified to provide for the transmission of the data at an increased data rate. This increased data rate permits a response message bit from the channel unit to be asserted on the RNPCM bus during a first time interval separate from that occupied by the increased rate data. During the smart mode, the line interface unit also controllably asserts a yellow alarm code signal onto the RNPCM bus during a second time interval that is separate from the first time interval and that occupied by successive bits of increased rate data.

35 Claims, 17 Drawing Sheets

INIT REQUEST

| 1234 5678 | DESCRIPTION |
|---|---|
| 0001 1000 | UNASSIGNED MULTIPLEX CODE |
| 0001 1000 | UNASSIGNED MULTIPLEX CODE |
| 0001 1000 | UNASSIGNED MULTIPLEX CODE |
| 0111 1110 | CONTROL MODE IDLE |
| 0111 1110 | CONTROL MODE IDLE |

INIT RESPONSE

| 1 | 234 5678 | DESCRIPTION |
|---|---|---|
| (x31) | 001 1000 | UNASSIGNED MULTIPLEX CODE |
| (x30) | 001 1000 | UNASSIGNED MULTIPLEX CODE |
| (x29) | 001 1000 | UNASSIGNED MULTIPLEX CODE |
| (x28) | 001 1000 | UNASSIGNED MULTIPLEX CODE |
| (x27) | 001 1000 | UNASSIGNED MULTIPLEX CODE |
| (x26) | 001 1000 | UNASSIGNED MULTIPLEX CODE |
| (x25) | 001 1000 | UNASSIGNED MULTIPLEX CODE |
| (x24) | 001 1000 | UNASSIGNED MULTIPLEX CODE |
| (x23) | 001 1000 | UNASSIGNED MULTIPLEX CODE |
| (x22) | 001 1000 | UNASSIGNED MULTIPLEX CODE |
| (x21) | 001 1000 | UNASSIGNED MULTIPLEX CODE |
| (x20) | 001 1000 | UNASSIGNED MULTIPLEX CODE |
| (x19) | 001 1000 | UNASSIGNED MULTIPLEX CODE |
| (x18) | 001 1000 | UNASSIGNED MULTIPLEX CODE |
| (x17) | 001 1000 | UNASSIGNED MULTIPLEX CODE |
| (x16) | 001 1000 | UNASSIGNED MULTIPLEX CODE |
| (x15) | 001 1000 | UNASSIGNED MULTIPLEX CODE |
| (x14) | 001 1000 | UNASSIGNED MULTIPLEX CODE |
| (x13) | 001 1000 | UNASSIGNED MULTIPLEX CODE |
| (x12) | 001 1000 | UNASSIGNED MULTIPLEX CODE |
| (x11) | 001 1000 | UNASSIGNED MULTIPLEX CODE |
| (x10) | 001 1000 | UNASSIGNED MULTIPLEX CODE |
| (x9) | 001 1000 | UNASSIGNED MULTIPLEX CODE |
| (x8) | 001 1000 | UNASSIGNED MULTIPLEX CODE |
| (x7) | 001 1000 | UNASSIGNED MULTIPLEX CODE |
| (x6) | 001 1000 | UNASSIGNED MULTIPLEX CODE |
| (x5) | 001 1000 | UNASSIGNED MULTIPLEX CODE |
| (x4) | 001 1000 | UNASSIGNED MULTIPLEX CODE |
| (x3) | 001 1000 | UNASSIGNED MULTIPLEX CODE |
| (x2) | 001 1000 | UNASSIGNED MULTIPLEX CODE |
| (x1) | 001 1000 | UNASSIGNED MULTIPLEX CODE |
| (x0) | 001 1000 | UNASSIGNED MULTIPLEX CODE |

*FIG. 21*

INIT COMMAND

| 7654 3210 | DESCRIPTION |
|---|---|
|  | (10 BIT TIMES OF STOP BITS) |
| 1111 0000 | (MESSAGE DELIMITER) |
| 1100 0001 | CONTROL FIELD/COMMAND OPCODE |
| (x31)...(x24) | THE 'x' BITS TO ECHO IN THE INIT RESPONSE MESSAGE |
| (x23)...(x16) |  |
| (x15)...(x8) |  |
| (x7)...(x0) |  |
| CCCC CCCC | LOW HDLC CRC BYTE |
| CCCC CCCC | HIGH HDLC CRC BYTE |
|  | (MESSAGE DELIMITER) |

*FIG. 22*

ENTER PM START

| 7654 3210 | DESCRIPTION |
|---|---|
|  | (MESSAGE DELIMITER FROM PREVIOUS MESSAGE) |
| 1100 0010 | CONTROL FIELD/COMMAND OPCODE |
| 0010 0000 | LOW HDLC CRC BYTE |
| 0100 0010 | HIGH HDLC CRC BYTE |
|  | (MESSAGE DELIMITER) |

*FIG. 23*

ACK RESPONSE

| 7654 3210 | DESCRIPTION OF RESPONSE STATUS BYTE VALUES |
|---|---|
|  | (MESSAGE DELIMITER FROM PREVIOUS MESSAGE) |
| 1000 0000 | CONTROL FIELD/COMMAND OPCODE |
| CCCC CCCC | LOW HDLC CRC BYTE |
| CCCC CCCC | HIGH HDLC CRC BYTE |
|  | (MESSAGE DELIMITER) |

*FIG. 24*

D4 CHANNEL BANK WITH MULTI-MODE FORMATTED, PERFORMANCE-MONITORING COMMUNICATION BUS

CROSS-REFERENCE TO RELATED APPLICATIONS

The present application is a continuation-in-part of application Ser. No. 08/027,948 (hereinafter referenced as the '948 application), filed Mar. 8, 1993, by Clifford Hall et al, entitled: "Performance Monitoring of DS0 Channel Via D4 Channel Bank," now U.S. Pat. No. 5,473,665, issued Dec. 5, 1995, assigned to the assignee of the present application and the disclosure of which is herein incorporated.

FIELD OF THE INVENTION

The present invention relates in general to telephone communication systems, and is particularly directed to a modification of line interface and channel unit portions of a D4 channel bank, so that a control site may perform prescribed network supervisory tasks with respect to one or more selected DS0 links, including performance monitoring of a DS0 loop. In addition, the modification of the D4 channel bank is such as to provide a simplified bidirectional signalling format over the channel bank's tri-stated RNPCM bus, that facilitates the use of asynchronous-based communication circuitry and avoids the problem of false yellow alarms.

BACKGROUND OF THE INVENTION

As described in the above-referenced '948 application, since established telephone networks have, for the most part, employed analog signalling devices, telephone companies have been reluctant to upgrade their copper wire-based equipment to include the use of digital signalling subsystems and communication schemes. Faced with substantial user demand, however, regional Bell operating companies (RBOCs) now offer leased-line digital services to sophisticated customers. These customers maintain their (digital) communications networks with intelligent management systems that provide detailed information regarding the quality of the service being delivered. This information enables the customer to develop long term statistics for error-free seconds, severely errored seconds, as well as channel availability, namely quantitative measures of the quality of service being leased.

Unfortunately, the network topographies and operating schemes currently embedded in an RBOC's network do not provide adequate information about the performance of the digital service access metallic loops between the serving central office and the network interface at the customer's premises. As a consequence, an RBOC is not readily prepared to deal with a customer's complaint that published digital services specifications are not being fulfilled. In addition, the local telephone companies also lack information necessary to observe the success of their own objectives toward delivering the services and a means to rapidly detect and respond to an outage or degradation in service.

Because of these recognized shortcomings, the RBOCs (and the Telcos in general) have sought to upgrade the diagnostic tools used for their digital carrier links, in order to enable them to monitor the performance of their metallic loops. Although complete system replacement is one straightforward approach, the service providers generally prefer add-ons or enhancements to already installed systems, thereby allowing the bulk of the existing equipment to be preserved and minimizing service interruption when upgrading the network.

Advantageously, the invention described in the above-referenced '948 application accommodates this preference of service providers, by upgrading office channel unit data port (OCU-DP) and line interface unit (LIU) components of an existing D4 channel bank, in such a manner that the RNPCM bus of the channel bank's internal communications link may be controllably tri-stated to provide bidirectional signalling capability. The bidirectional signalling format on the controllably tri-stated RNPCM signalling bus is defined to support both the transmission of incoming (received DS1) signalling traffic from the line interface unit to an office channel unit, and the exchange of performance-monitoring command and response messages related to the operation of a DS0 loop, in a manner that is transparent to digital services subscribers.

In addition, each of the channel unit and a digital data services network termination (DDST) serving the customer's premises is augmented by means of a performance monitoring scheme that allows at least one prescribed performance aspect of the DS0 channel to be monitored, in each of the channel unit-to-DDST direction and the DDST-to-channel unit direction, with DS0 channel quality-representative messages being forwarded to the line interface unit over the bidirectional RNPCM bus.

Within the channel unit of the D4 bank, one or more prescribed performance aspects of the DS0 loop are monitored, and information representative of each monitored performance aspect is stored. In response to a command message from the line interface unit, a reply message containing stored DS0 channel performance information is assembled and clocked onto the bidirectional communications link, so that it may be captured by the line interface unit and reported to a supervisory control unit external to the channel bank.

SUMMARY OF THE INVENTION

Now, although the 'user-transparent' performance monitoring and reporting scheme described in the above-referenced '948 application offers a significant improvement over conventional D4 channel bank equipment (which provide no subscriber-transparent performance monitoring and reporting mechanism), it has been found that the signalling format employed for bidirectional signalling over the channel bank's RNPCM bus may be simplified so as to both facilitate the use of asynchronous-based communication circuitry in the line interface unit (LIU) and channel unit (OCU-DP) equipments, while at the same time circumventing the problem of false yellow alarms.

For this purpose, the present invention involves modifying the data communication format on the RNPCM bus to include two additional non-normal data communication formats, hereinafter referred to as an RNPCM INIT data format and an RNPCM SMART data format. The RNPCM INIT data format is employed during an initialization (INIT) mode of operation of a channel bank, that has been upgraded in accordance with the present invention to convey initialization command messages from a 'smart' (i.e. performance monitoring-capable) line interface unit to a smart channel unit.

The RNPCM INIT bus format is the same as the normal RNPCM bus format, with the exception that it provides for the insertion of a single auxiliary command bit, termed a Crx bit, between the b6 and b7 bits. This additional Crx bit is employed by a smart line interface unit to transmit command information to a smart channel unit. Inserting the auxiliary Crx bit 'between' normal bit locations prevents it from being coincident with either of the sampling edges of the RCLK signal that is customarily employed to sample the RNPCM bus, so that the inserted Crx bit will not be erroneously sampled by these RCLK signal edges. Moreover, selecting the inserted location of the auxiliary command bit Crx to fall between the sixth and seventh bit locations minimizes corruption of an inadvertently sampled voice signal byte, without affecting the eighth bit position, which is sometimes employed for the transmission of call establishment control information.

The RNPCM SMART format is used during a 'Smart' mode of operation of an upgraded channel bank, to convey command messages from an upgraded, performance monitoring-capable, 'smart' line interface unit to an upgraded, performance monitoring-capable 'smart' channel unit, as well as to convey response messages from a smart channel unit to the smart line interface unit. It is also used to prevent the occurrence of false yellow alarms.

The RNPCM SMART format effectively compresses or shortens the duration of each of the data bits b1–b8 of a data byte to a time interval on the order of one-half that of the normal bit duration, and provides for the insertion of three additional information bits within the remaining available portion of the normal (eight bit) data byte period. More particularly, the first two normal data bits b1 and b2 are replaced by a single bit $b_{YA}$ associated with a 'yellow alarm' code. This yellow alarm code is asserted on the RNPCM bus by a smart line interface unit, when the smart line interface unit has determined that a true yellow alarm condition exists. Unless the line interface unit has verified the occurrence of a valid yellow alarm condition, the state of the first two bit positions b1 and b2 will be asserted as a logical '1', so that the b2 bit (associated with a yellow alarm condition in the event of a prescribed number of zeros in this bit position) cannot be inadvertently misread as a zero bit by the receive unit of the common equipment, which is connected to the RNPCM bus.

In accordance with a further aspect of the RNPCM SMART format, immediately following the yellow alarm bit $b_{YA}$ is a Ctx bit, which replaces the third bit-b3 of a normal data format. This auxiliary bit Ctx is employed by a smart channel unit to transmit response information to a command message from an interrogating smart line interface unit. A response message defined by the Ctx bit has the same format as the auxiliary Crx command bit. The Ctx bit is of the same duration as and is coincident with the bit position of a normal b3 bit. Following the Ctx bit are compressed data bits b1–b8 and the interleaved Crx bit, which are positioned in the data stream so as to allow each bit to be sampled by a respective successive edge of the RCLK signal employed to sample the RNPCM bus. The compressed (one-half normal bit duration) format of the RNPCM SMART mode is achieved by using a rate-doubled receive clock signal.

Declaration of a yellow alarm condition (associated with a remote terminal having detected a communication problem and asserting a zero bit in the b2 bit position of a T1 data byte) is customarily predicated upon the receive unit of the common equipment detecting the presence of a zero bit in the b2 bit position of some prescribed number of the channel unit time slots of a digroup. This number typically falls within a range of seventeen to twenty-four time slots, depending upon the manufacturer of the equipment. When using the RNPCM SMART mode communication format, prior to asserting a yellow alarm code in the yellow alarm bit position $b_{YA}$, the line interface unit requires that a zero be asserted in all 24 time slots of a di-group. Since the yellow alarm bit position $b_{YA}$ ordinarily contains the normal b2 bit position (and also the b1 bit position, as described above), the receive unit of the common equipment is assured of not detecting a yellow alarm code unless, in fact, a valid yellow alarm condition has been asserted by the line interface unit. If the line interface unit has not determined that a valid yellow alarm condition exists (for example by having detected that the bit position b2 is not a zero for each time slot in the T1 data stream), it will assert a logical '1' for entirety of the duration of the bit value of the yellow alarm bit position $b_{YA}$ (namely, for the duration of both normal bits b1 and b2), and thereby prevent the channel bank's receive unit from detecting a false yellow alarm condition. The actual b2 data bit itself is transposed to a location in the modified data byte format to fall between the normal b4 and b5 bit positions, so that it will not be read as a yellow alarm bit by the receive unit.

An enhanced smart performance monitoring (PM) line interface unit portion of a D4 channel bank that has been upgraded in accordance with the invention includes the same signalling, timing and control components as a conventional line interface unit, plus additional circuitry which effectively converts a conventional line interface unit into a smart performance-monitoring line interface unit (PM-LIU). Although the information bits of a recovered DS1 data stream are customarily asserted on an RPCM line from the output of an ESF-to-SF frame converter, in accordance with the invention, each end of the RNPCM bus is terminated by way of a controllably tri-stated multiplexer, which allows the RNPCM bus to be employed as a bidirectional communication link between the LIU and a channel unit.

The enhanced LIU of the invention includes a DS1 SF framer and a TPCM monitor unit to which the transmit data and transmit clock lines are coupled from the D4 channel bank's transmit unit. The DS1 SF framer processes the contents of the TPCM link and the RCLK line and supplies a frame sync signal and a slot pulse signal to the TPCM monitor unit. The TPCM monitor unit selects a timeslot to be monitored by a supervisory LIU control processor for in-band messages, a byte at a time, supplied over the TPCM bus.

The LIU end of the RNPCM bus is terminated by way of controllably tri-stated data multiplexer, which is coupled to receive a yellow alarm logic level and a broadcast logic level from the control processor. The command or Crx bit is supplied by a performance monitoring byte transmit logic circuit, which is coupled to the LIU's control processor. A performance monitoring byte transmit logic circuit assembles respective command bit bytes and couples these bytes to the data multiplexer.

Steering control inputs to the data multiplexer include a 'smart' control signal from a smart timeslot discriminator, and a smart channel control signal from a performance-monitoring channel selector. The timeslot discriminator is controlled by a timeslot count signal supplied by a timeslot identifier. The timeslot identifier includes a controlled counter, which is coupled to receive the RCLK signal and a frame sync signal supplied from a frame converter and sequentially steps through successive time slots associated with the channel units of a di-group, providing successive timeslot identification signals. The timeslot discriminator is informed as to which time slots are associated with 'smart' performance-monitoring channel units, for which the smart data mode is employed. Associated with a SMART timeslot signal is a SMARTCHNL control signal from the performance-monitoring channel selector. The PM channel selector is controlled by the timeslot count signal by the timeslot identifier. The PM channel selector is further coupled to the processor. For any channel unit that is not to receive a command message from the LIU, stop bits are continuously output by the data multiplexer.

The LIU further includes a performance monitoring byte receive control logic circuit, which decodes the contents of a timeslot pulse line, a SMART control line, a SMARTCHNL line, an RCLK line, and the processor bus, and couples a tristate control signal to a tristatable bus driver for the RNPCM bus. The tristate control signal normally enables the RNPCM bus driver for active transmission of output data bytes from the LIU over the RNPCM bus. For a performance monitoring command and response message exchange between the LIU and a destination channel unit, the PM byte receive logic is operative to change the state of the tristate driver during the bit time that a Ctx bit from the interrogated channel unit is expected to be asserted on the RNPCM bus, so that the RNPCM bus driver is disabled from asserting data onto the RNPCM bus. As a result, the Ctx bit on the RNPCM bus may be read, so that the Ctx bit may be captured and applied to the LIU processor.

A 'smart' performance-monitoring channel unit in accordance with the present invention employs clock generator and data storage and control logic which provide various clock signals for asserting data onto the RNPCM bus and reading (sampling) the bus.

Upon installation of a performance monitoring-capable or 'smart' channel unit in a D4 channel bank, the unit is configured to repeatedly transmit an INIT REQUEST message over the TDATA bus to the LIU, for a prescribed time-out period. In the absence of a response from the LIU on the RNPCM bus prior to the end of this time out, the transmission of the INIT REQUEST message is terminated. The time-out prevents a SMART channel unit from continuously attempting to request initialization from a non-smart LIU. While in the initialization mode, the channel unit disables transmission to the local loop.

The transmit unit of the common equipment couples this initialization message that has been asserted onto the TDATA line over the TPCM lead to the LIU. The LIU continuously scans successive timeslots associated with channel units of a digroup for the in-band INIT REQUEST message being transmitted by a SMART channel unit. In response to detecting an INIT REQUEST message for a respective timeslot TSi, the LIU modifies the normal data format for that timeslot T Si on the RNPCM lead to the RNPCM INIT format, and uses the Crx bit position to transmit an INIT COMMAND data packet on the RNPCM bus back to the channel unit that has sourced the INIT REQUEST message.

After it has asserted an INIT REQUEST message on the TDATA lead, the channel unit monitors the RNPCM bus and samples the Crx bit position of the RNPCM INIT format of the bus for the return of the INIT COMMAND message from the LIU. Upon receipt of the INIT COMMAND message from the LIU, the channel unit asserts an INIT RESPONSE message onto the TDATA bus. This INIT RESPONSE message corresponds to the same byte information field contained within the INIT COMMAND message transmitted by the LIU, so that the LIU may verify that the destination channel unit is co-located in the same D4 channel bank as the LIU. The channel unit continues to repeatedly assert the INIT RESPONSE information field onto the TDATA bus for a prescribed time interval or until in receives an ENTER RNPCM SMART mode command message from the LIU.

After asserting an INIT COMMAND message on the RNPCM bus, the LIU monitors the TPCM lead from the transmit unit for an INIT RESPONSE message that has been asserted onto the TDATA bus by the channel unit. If the INIT RESPONSE message is not detected within a prescribed time interval after it has transmitted the INIT COMMAND message, the LIU infers that the channel unit is not a SMART channel unit and proceeds to configure the timeslot of interest to normal RNPCM mode and scans the next timeslot. If the proper INIT RESPONSE message has been returned by the channel unit, the LIU configures its data multiplexer for the RNPCM SMART mode, and asserts an ENTER PM SMART mode command message onto the RNPCM bus.

After it has asserted an INIT RESPONSE message to the LIU on the TDATA lead, the channel unit monitors the RNPCM bus and samples the Crx bit position of the RNPCM INIT format of the bus for the return of the ENTER PM SMART message from the LIU. Upon receipt of the ENTER PM SMART command message from the LIU, the channel unit transitions to the PM SMART MODE. When transitioning to this mode, the channel unit proceeds to reconfigure the TDATA bus for the normal data format, and also asserts an acknowledge message onto the RNPCM bus using the bit position customarily occupied by the b3 bit of a normal data format to assert a Ctx bit on the RNPCM bus, as described above.

In response to the detecting that an acknowledge message has been asserted onto the RNPCM bus by the channel unit, which verifies that both the LIU and the channel unit are configured for SMART mode message exchanges, the LIU proceeds to conduct asynchronous command and response message communications with the channel unit. Return message timeouts are preferably employed by each of the LIU and channel units to avoid either unit from becoming 'stuck' in a waiting condition. If message is not returned within the required timeout, the unit reverts to the normal mode for that time slot.

BRIEF DESCRIPTION OF THE DRAWINGS

FIG. 21 shows the format of an INIT COMMAND message;

FIG. 22 shows the format of an INIT RESPONSE message;

FIG. 23 shows the format of the ENTER PM SMART message; and

FIG. 24 shows the format of an ACK message.

DETAILED DESCRIPTION

Figure 1:
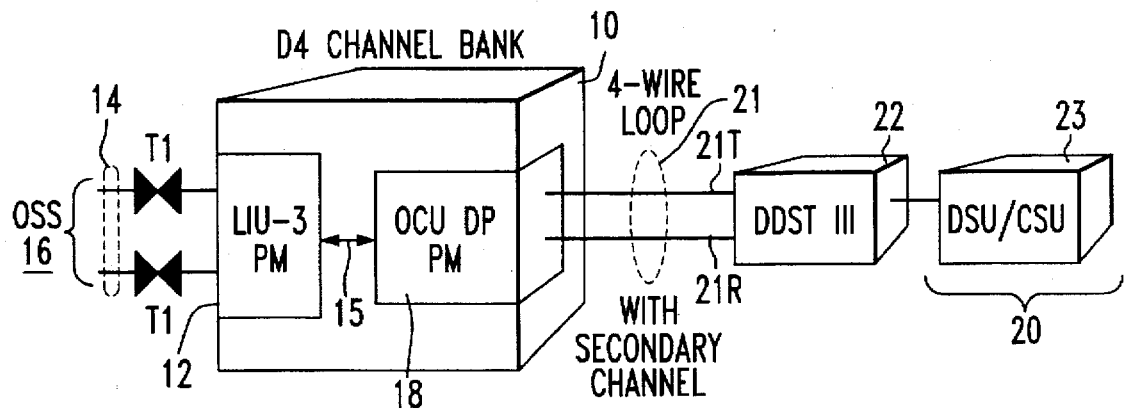
FIG. 1 diagrammatically illustrates an AT&T-compatible D4 channel bank installed in a typical digital carrier telephone network, through which digital services may be provided by the network to digital signalling equipment located at a customer's premises.

Before describing in detail the new and improved DS0 channel performance monitoring mechanism in accordance with the present invention, it should be observed that the invention resides primarily in the modification of conventional D4 channel bank and digital data service components, together with an augmentation of the communications control software employed in the channel bank, so as to permit a supervisory performance monitoring controller to selectively establish a control link with and exchange DS0 loop-performance command and response messages with DS0 channel units on selective basis. The details of the circuitry of the line interface and channel units are otherwise essentially unaffected.

Accordingly, the structure, control and arrangement of these conventional circuits and components have been illustrated in the drawings by readily understandable block diagrams which show only those specific details that are pertinent to the present invention, so as not to obscure the disclosure with structural details which will be readily apparent to those skilled in the art having the benefit of the description herein. Thus, the block diagram illustrations of the Figures do not necessarily represent the mechanical structural arrangement of the exemplary system, but are primarily intended to illustrate the major structural components of the system in a convenient functional grouping, whereby the present invention may be more readily understood.

Figure 2:
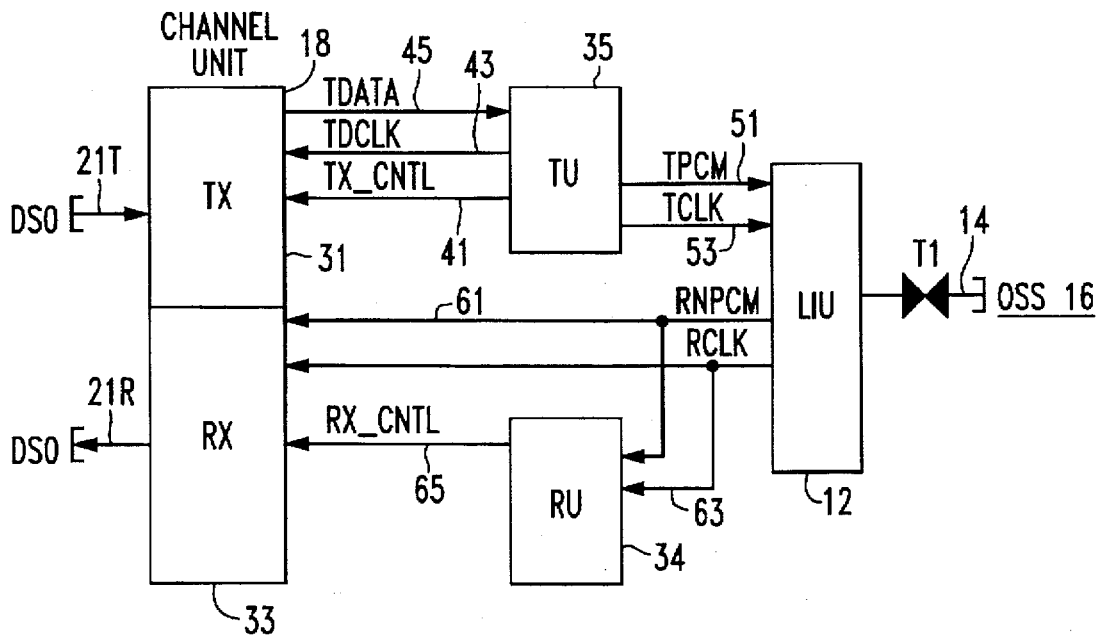
FIG. 2 diagrammatically shows the manner in which a line interface unit and an office channel unit data port of a D4 channel bank communicate with one another by way of a PCM communications link.
Figure 3:
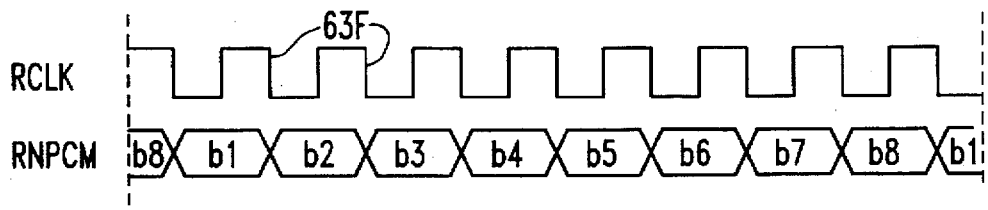
FIG. 3 diagrammatically illustrates the format of data strobes asserted onto the RNPCM bus.

In order to facilitate an appreciation of the manner in which the present invention provides a simplified bidirectional signalling format on the channel bank's RNPCM bus, so as to facilitate the use of asynchronous-based communication circuitry in each of the line interface unit and channel unit components of the channel bank, and also avoid the problem of false yellow alarms, the configuration and operation of a conventional D4 channel bank will be briefly reviewed with reference to FIGS. 1–3.

More particularly, FIG. 1 diagrammatically illustrates an AT&T-compatible digital carrier terminal or D4 channel bank 10, such as that manufactured by Adtran Corporation, Huntsville, Ala., installed in a typical digital carrier telephone network, through which digital services may be provided by the network to digital signalling equipment located at a customer's premises 20. Channel bank 10 typically contains a line interface unit (LIU) 12 which interfaces one end of a T1 (1.544 Mb/s) communications link 14. A second end of T1 link 14 may be connected to another office containing an operational support system (OSS) 16 located remotely with respect to the office in which D4 channel bank 10 is installed. Also contained in D4 channel bank 10 is an office channel unit data port (OCU-DP) 18, which is coupled to LIU 12 via an intra D4 bank PCM communications link 15. OCU-DP interfaces bipolar signals on respective portions 21T and 21R of a local four-wire DS0 metallic (copper) link 21. DS0 link 21 is coupled to a digital data service termination (DDST) 22, which terminates the metallic loop 21 with a data service unit/channel service unit (CSU/DSU) 23 located at the customer's premises 20.

The LIU 12 and OCU-DP 18 within the D4 channel bank 10 include respective transmit/receive buffers associated with the respective (bipolar/DS1/DS0) ports of that unit. These buffers are controlled by a resident microcontroller for interfacing DS1-formatted data traffic from the T1 link side of the terminal, retiming the traffic as a bipolar data stream for transmission as a DS0 data stream from the D4 channel bank 10 to the customer's DSU/CSU site 20, and reconverting bipolar signals, supplied from the customer site 20 to OCU data port 18, into DS1 data frames for transmission over T1 link 14 to the remote site.

The manner in which LIU 12 and OCU-DP 18 of D4 channel bank 10 communicate with one another by way of PCM communications link 15 is diagrammatically shown FIG. 2. OCU-DP 18 has a transmitter section 31, to which DS0 data from the four wire metallic loop 21 is supplied from the customer site termination equipment, and a receiver section 33, from which DS0 data is coupled to four wire metallic loop 21 for delivery to the customer site termination equipment. The transmitter section 31 is coupled via a set of transmission leads 41, 43 and 45 to a transmit unit 35. Lead 45 is employed as a transmit data (TDATA) bus for carrying serialized data bits from the transmitter section 31 of the channel unit 18 to transmit unit 35. Link 41 contains a set of transmit sequence control leads on which transmission control signals TX_CNTL signals from transmit unit 35 are asserted for controlling the format of data transmissions from the channel unit 18 on the TDATA lead 45. Link 43 is a clock lead on which a transmit clock signal TDCLK is asserted by transmitter section 31.

In response to the control and clock signals on leads 41 and 43, the transmitter section 31 of channel unit 18 decodes its respective channel select strobe and transmits data packets onto transmit data TDATA bus 45 in a respective one of a plurality (e.g. 24) multiplexed channel unit time slots of a multi-channel (e.g. 24 channel) unit digroup within the D4 bank. Pursuant to industry (AT&T-defined) communication standards, the channel select strobe occurs at an 8 KHz rate, so that with an eight bit byte being asserted for each strobe, a 64 Kb/s (DS0) channel is provided for a DS1 line. As data is serialized out over the TDATA bus 45, transmit unit 35 collects the 192 (8 bits from each of the (24) channel units), appends a framing bit, and outputs the resulting DS1-formatted PCM data stream onto TPCM link 51, and an associated transmit clock signal via TCLK link 53 to the LIU 12. The line interface unit 12 couples the formatted DS1 data onto the digital carrier for transmission over T1 link 14.

Although not illustrated in FIG. 2, an additional link may be provided for allowing analog channel units to deliver pulse amplitude modulated samples of analog signals to be coupled to transmit unit 35 for subsequent conversion to PCM data bytes and insertion into the appropriate channel unit time slot of TPCM link 51. 'A' and 'B' signalling bits may also be coupled to transmit unit 35 from an analog channel unit for insertion into the LSB position of the data byte of frame six ('A' bit), and frame twelve ('B' bit) of the superframe. Line interface unit 12 may convert a superframe format provided by transmit unit 35 to DS1 extended superframe format.

On the DS1 receive side, incoming T1 carrier signals from link 14 are received by line interface unit 12, and extended superframe format is converted into superframe formatted signals, as necessary. Payload or signalling bits are not altered. The DS1 data is asserted onto a receive RNPCM bus 61, which is coupled to receive unit 34 and to the receiver section 33 of each channel unit 18 of the D4 bank. The DS1 clock within the T1 data is recovered by LIU 12 and applied as a recovered clock signal on RCLK link 63, which is also coupled to receive unit 34 and to the receiver section 33 of each channel unit 18.

FIG. 3 diagrammatically illustrates the format of data strobes asserted onto the RNPCM bus 61 as sequential information bits bi (eight bits b1–b8 per channel) by the LIU 12, coincident with the falling edges 63F of the recovered clock RCLK signals, thereby allowing for a one-half bit time of set-up and one-half bit time of hold.

The receive unit 34 synchronizes its timing with the DS1 framing pattern of the received signal and supplies channel unit control signals over RX_CNTL link 65 to the receiver section 33 of each channel unit in the D4 bank. This allows each channel unit to decode its channel select strobe for the received data and to extract its corresponding byte of data from the associated time slot of RNPCM data bus 61.

Again, although not illustrated in FIG. 2, in the receive direction, an additional analog signalling link may be provided to allow analog channel units to deliver PAM samples of analog signals (converted from PCM bytes), which are then coupled from receive unit 34 to the appropriate analog channel unit. RX_CNTL link 65 contains a set of sequence control leads that are employed to control receive signalling format, including the contents of frames six and twelve of a superframe. The receiver section 33 of the channel unit 18 recovers the appropriate 'A' or 'B' signalling bit during the appropriate frame when the channel select strobe is active.

It should be noted that in the D4 channel bank configuration of FIG. 2, all channel units in the D4 channel bank share the transmit and receive data buses 45 and 61, respectively, so that each channel unit has physical access to every DS0 time slot in a digroup. However, time slot allotment is multiplexed under control of control and clock signals supplied by the transmit unit 35 for the transmit direction and by the receive unit 34 for the receive direction.

Figure 4:
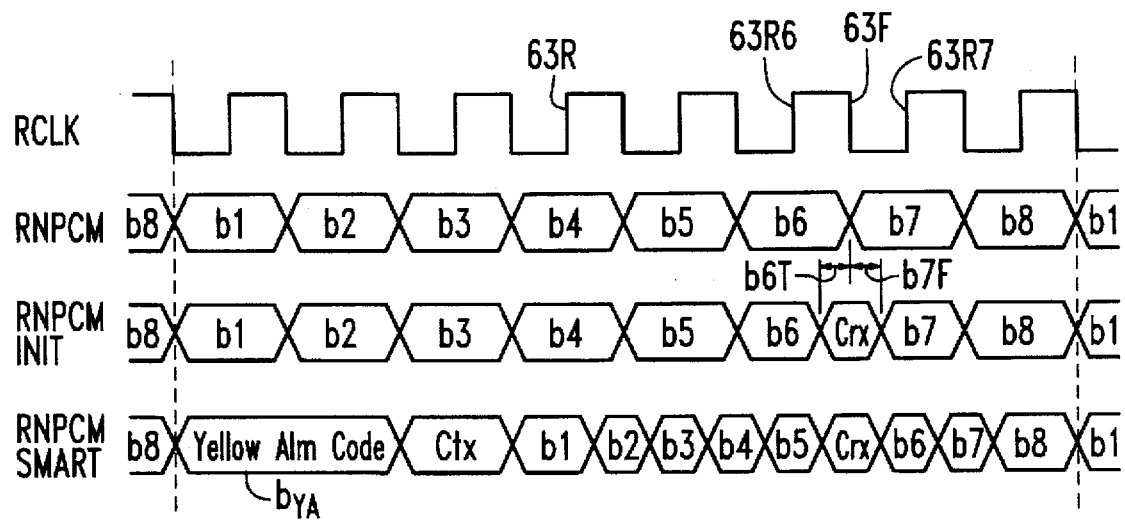
FIG. 4 diagrammatically illustrates the manner in which the data strobes of FIG. 3 are modified in accordance with the present invention, to provide a simplified data format for bidirectional signalling, and to avoid the generation of false yellow alarms.

FIG. 4 diagrammatically illustrates the manner in which the data strobes of FIG. 3, referenced above, are modified in accordance with the present invention, to provide a simplified data format for bidirectional signalling, on the one hand, and to avoid the generation of false yellow alarms, on the other hand. In addition to illustrating the recovered clock signals as RCLK, and the conventional or 'normal' data strobes as RNPCM, FIG. 4 shows two additional data formats labelled as 'RNPCM INIT' and 'RNPCM SMART'.

The data format labelled as RNPCM INIT is used during an Initialization mode of operation (to be described) of a channel bank upgraded in accordance with the present invention, to convey command messages from the line interface unit to a channel unit. As illustrated, the RNPCM INIT data format is essentially identical to the normal RNPCM format, with the exception that it provides for an abbreviation of the tail end portion of the b6 bit (shown at b6T), and the front end portion each of the b7 bit (shown at b7F), together with the insertion of a single auxiliary bit Crx between the abbreviated b6 and b7 bits. The auxiliary bit Crx is a command bit employed by the line interface unit to transmit command information to a channel unit.

Figure 5:
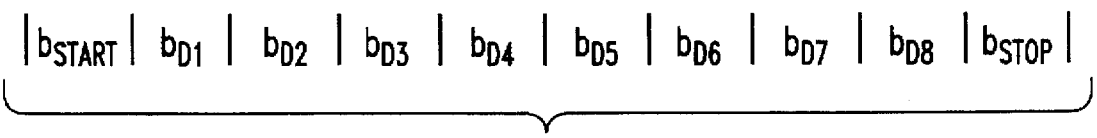
FIG. 5 diagrammatically illustrates the format of a command information packet.

As diagrammatically illustrated in FIG. 5, a command information packet from the LIU consists of a START bit $b_{START}$ (e.g. a ground voltage level on the RNPCM bus 61), followed by eight data bits $b_{D1}$–$b_{D8}$, transmitted least significant bit first, where a logical '1' corresponds to the assertion of ground on the RNPCM bus, and a STOP bit $b_{STOP}$ (e.g. +5 volts asserted on the RNPCM bus).

The insertion of the auxiliary bit Crx between the sixth and seventh bit locations serves a two-fold functional purpose. First, from FIG. 4, it may be observed that the auxiliary bit Crx is inserted at a location in the data stream that is not coincident with either of the sampling rising edges 63R of the RCLK customarily employed to sample the RNPCM bus, so that it will not be erroneously sampled by these clock edges. Instead, bit Crx is generally centered about that falling edge 63F of the RCLK signal between those rising edges 63R6 and 63R7 that are used to sample the bits b6 and b7, respectively. Also, the degree of shortening or compression of bits b6 and b7 provides for sufficient stabilization of the RNPCM bus that these bits may still be accurately sampled by associated rising edges 63R6 and 63R7 of the RCLK signal.

Secondly, locating the auxiliary command bit Crx between the sixth and seventh bit locations minimizes corruption of an inadvertently sampled voice signal byte, without affecting the eighth bit position. Since the eighth bit position b8 of a data byte may be employed for the transmission of control/call establishment information (such as the A and B bits, referenced above), it is preferred that the eighth bit position be unaffected or minimally affected. Placing the auxiliary command bit Crx between the sixth and seventh bit positions b6 and b7 accomplishes both objectives.

The data format labelled as RNPCM SMART is used during a 'Smart' mode of operation (to be described) of an upgraded channel bank, to convey command messages from an upgraded, performance monitoring-capable, or 'smart' line interface unit to an upgraded, performance monitoring-capable or 'smart' channel unit, as well as response messages from such smart channel unit to the smart line interface unit. It is also used to prevent the occurrence of false yellow alarms, as will be described.

The RNPCM SMART data format is considerably modified from the normal RNPCM format, in that it effectively compresses the duration of each of the data bits b1–b8 to a time interval on the order of one-half that of the normal bit duration, and provides for the insertion of three additional information bits within the time span of the normal (eight bit) data byte period shown at RNPCM. In accordance with the RNPCM SMART data format, the first two normal bit periods for bits b1 and b2 are replaced by a single bit $b_{YA}$ associated with a 'yellow alarm' code. This yellow alarm code is asserted on the RNPCM bus by a smart line interface unit when it has determined that a true yellow alarm condition exists, thereby causing the receive unit 34 of the channel bank 10 to declare a yellow alarm condition. As will be described, unless a yellow alarm condition has been determined by the line interface unit, the state of the first two bit positions b1 and b2, in particular the second bit position b2 normally associated with the yellow alarm code, cannot be inadvertently misasserted as representative of a yellow alarm condition, except as all 24 channels may transmit all zeros.

Immediately following the yellow alarm bit $b_{YA}$ is a Ctx bit, which replaces the third bit b3 of a normal data format. The auxiliary bit Ctx is a response bit employed by the channel unit to transmit response information to the line interface unit. The Ctx bit has the same format as the auxiliary command bit Crx, diagrammatically illustrated in FIG. 5. The Ctx bit is of the same duration and coincident with the normally formatted b3 bit, and is followed by a delayed and slightly compressed or abbreviated b1 bit.

As shown in FIG. 4, the b1 bit and successive bits b2–b5, Crx and b6–b8 occur at locations in the data stream that allows each of these bits to be sampled by a respective successive edge (either rising or falling) of the RCLK signal employed to sample the RNPCM bus. In addition, the duration and location of the Crx bit in the RNPCM SMART format data stream is the same as in the RNPCM INIT data format, so that the Crx bit may be sampled by the same falling edge 63F of the RCLK signal between successive rising edges 63R6 and 63R7 that are used to sample the data bits b6 and b7, respectively.

It may also be observed that the duration of each of successive bits b2–b5, Crx, b6 and b7 is effectively half that of the normal data bit duration. As will be described, the compressed data bit format of the RNPCM SMART mode of FIG. 4 is achieved by the use of a speeded up (doubled) receive clock signal RCLK2.

As pointed out above, in a D4 channel bank, declaration of a yellow alarm condition (associated with a remote terminal having detected a communication problem and asserting a zero bit in the b2 bit position of a T1 data byte) is customarily predicated upon the receive unit 34 detecting the presence of a zero bit in the b2 bit position of some prescribed number of the channel unit time slots of a digroup. This number typically falls within a range of 17 to 24 time slots, depending upon the manufacturer of the equipment.

In accordance with the invention, before it asserts a yellow alarm code in the yellow alarm bit position $b_{YA}$, the LIU 12 is operative to require that a zero be asserted in all 24 time slots of a di-group. Since, as shown in FIG. 4, the yellow alarm bit position $b_{YA}$ includes the time interval customarily occupied by the normal b2 bit position, the receive unit 34 is assured of sampling a true yellow alarm code, when it has been asserted on the RNPCM bus by the LIU. On the other hand, if the LIU has not determined that a true yellow alarm condition exists (by having detected that the bit position b2 is not a zero for each time slot in the T1 data stream), it will assert a logical '1' for entirety of the duration of the bit value of the yellow alarm bit position by $A_{YA}$, which will prevent the receive unit 34 of the channel bank 10 from detecting a yellow alarm condition. As shown in FIG. 4, in the SMART MODE, the actual b2 bit is transposed to a location between the normal b4 and b5 bit positions, so that it will not be read as a yellow alarm bit by the receive unit 34.

The ability of the line interface unit 12 to control the declaration of a yellow alarm condition is effective not only for superframe mode of operation, but is especially important in extended superframe format, since the T1 link employs out-of-band patterns with a specific declaration of yellow alarm. The LIU 12 receives out-of-band communications that cannot be data dependent and declares a yellow alarm condition on the RNPCM bus 61 to the receive unit 34.

Figure 6A:
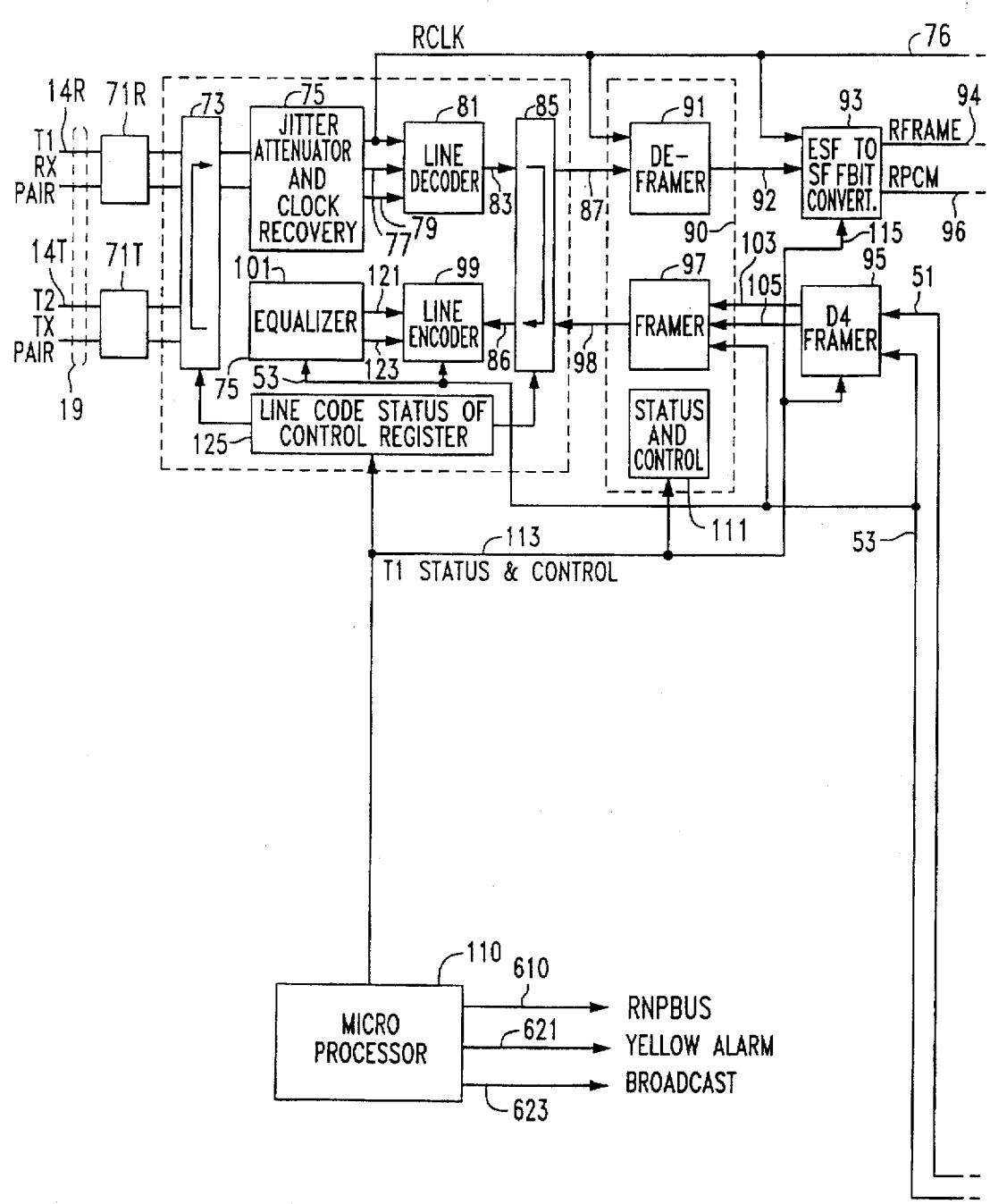
FIG. 6 diagrammatically shows the manner in which a line interface unit of a conventional AT&T compatible D4 channel bank may be modified to execute the above-referenced 'smart' performance-monitoring functionality of the present invention.
Figure 6B:
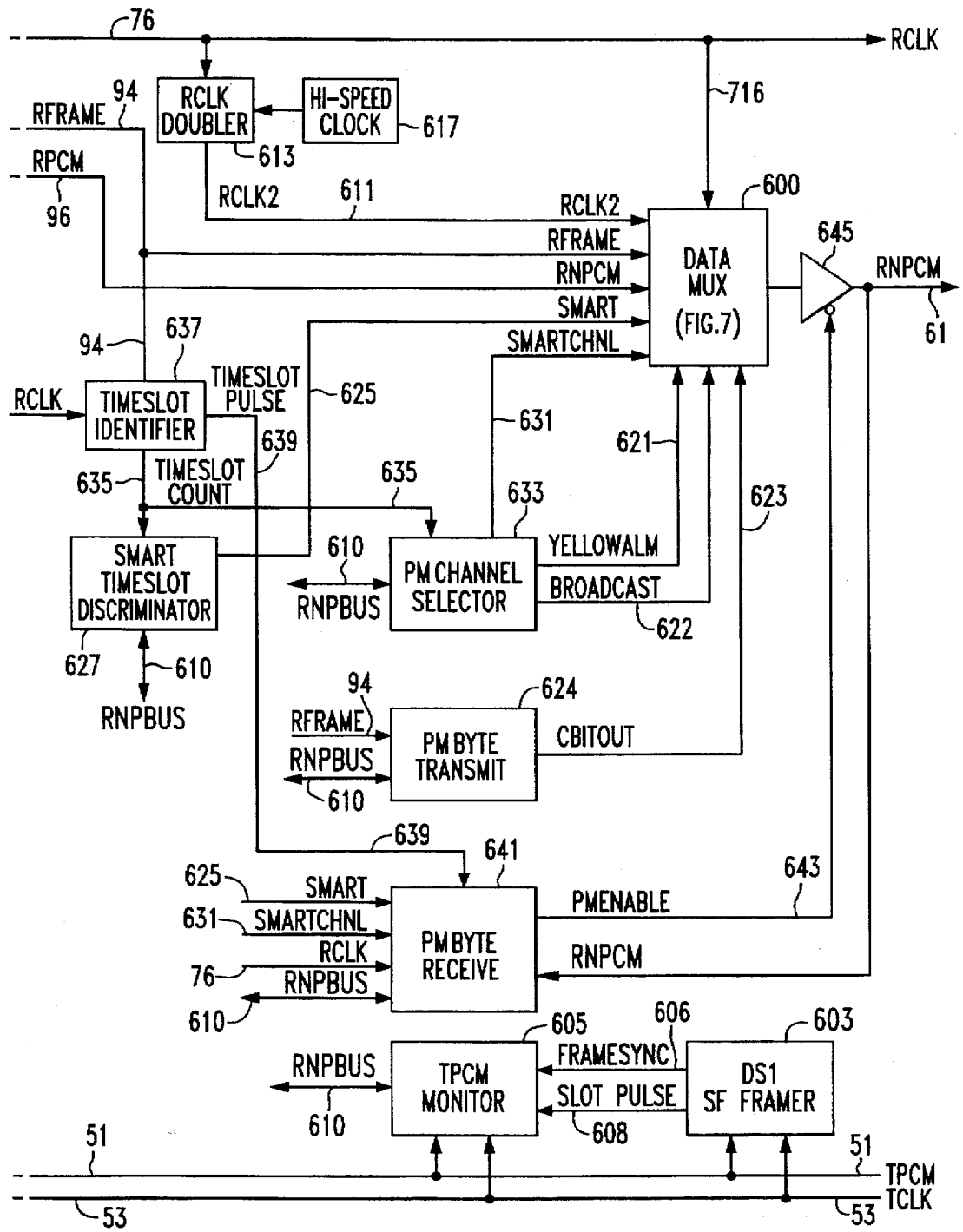

FIG. 6 diagrammatically shows the manner in which a line interface unit 12 of a conventional AT&T compatible D4 channel bank may be modified to execute the above-referenced 'smart' performance-monitoring functionality of the present invention. As will be described, the enhanced smart performance monitoring (PM) line interface unit portion of the D4 channel bank includes the same signalling, timing and control components as a conventional line interface unit, plus additional circuitry which effectively converts a conventional LIU into a smart performance-monitoring LIU.

In the diagrammatic illustration, the components of a conventional LIU are designated by single lines, while the upgrading circuitry of the present invention is shown in double lines and is identified by three digit reference numerals which begin with the prefix '6'. In order to facilitate an understanding of the LIU enhancement provided in accordance with the present invention, the configuration and operation of the LIU of a conventional D4 channel bank will be briefly reviewed, followed by a description of the additional circuitry, which provides the LIU with the above-described smart performance-monitoring and false yellow alarm prevention capability. It should also be noted that the details of the illustrated LIU communication circuitry corresponds to one-half of a digroup within the LIU; the other half of the digroup has been omitted from the Figure in order to simplify the drawing. Each digroup shares the same external signalling interface and supervisory control circuitry.

The T1 carrier link 14 includes a receive pair portion 14R and a transmit pair portion 14T, which are respectively coupled, via transformers 71T and 71R, to a controlled loopback relay interface 73. Incoming T1 receiver pair 14R supplies bipolar non-return to zero (NRZ) signals, which are coupled through loopback interface 73 to a jitter attenuator and clock recovery unit 75. Clock recovery unit 75 recovers the receive clock RCLK from the incoming T1 carrier signal and outputs the recovered clock signal RCLK over link 76 to downstream signal processing circuitry, to be described. In addition, clock recovery unit 75 outputs respective RPOS and RNEG (bipolar TTL-CMOS level) signals on links 77 and 78 to a line decoder 81. (RPOS goes active high for a positive one on the T1 line, and RNEG is active high for a negative one on the T1 line.)

Line decoder 81 decodes the contents of RPOS and RNEG links 77 and 78, respectively and recovers either an alternate mark inversion format (AMI) or bipolar B8ZS (bipolar eight zero substitution) format and delivers the decoded serialized data stream over line 83 through a further loopback relay interface 85 and therefrom over link 87 to a deframer 91 of a framing/deframing unit 90.

Deframer 91 synchronizes the framing pattern (superframe SF or extended superframe ESF) with the recovered clock RCLK and, via its embedded status and control capability, analyzes the decoded data stream with respect to prescribed status indicators, such as whether the data contains extensive frame bit errors, whether an excessive number of zeros have been received, whether a yellow alarm is active, whether there are excessive bipolar violation errors, whether a loss of carrier (too many consecutive zeros) has been detected, and the presence of a blue alarm (an unframed all one's pattern). The serial synchronized data stream is then coupled via link 92 to an extended superframe (ESF) to superframe (SF) converter 93, which is operative to convert the frame format to SF, only if the data format is ESF, with one ESF becoming two SFs. Otherwise, ESF-to-SF converter 93 passes the data 'as is' to an RPCM link 96 for application (in an inverted format) to the receive section 33 of channel unit 12. (The D4 channel bank receive unit 34 normally accepts only SF formatted data.)

Figure 7A:
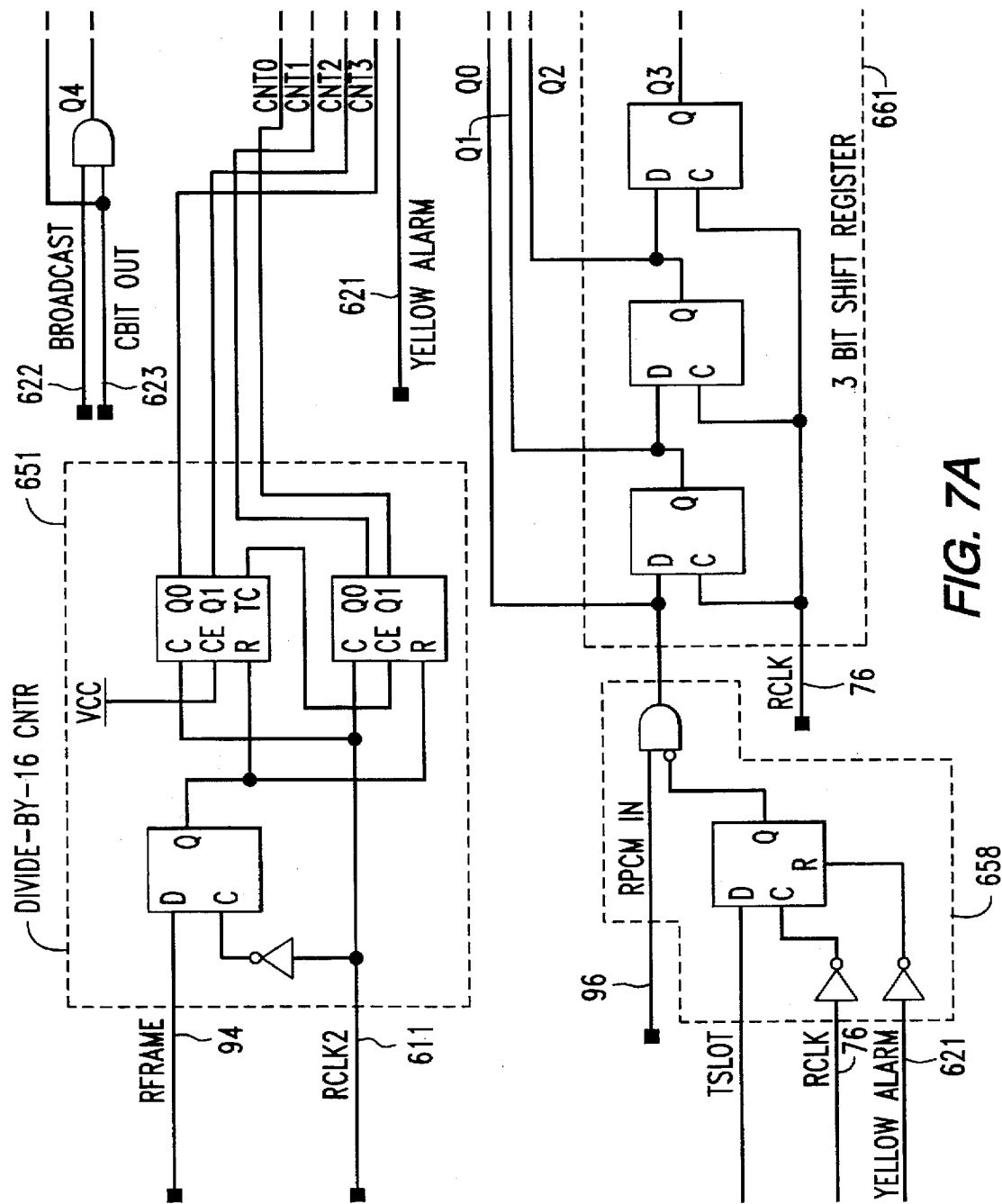
FIGS. 7A and 7B shows the configuration of the data multiplexer 600 of FIG. 6.
Figure 7B:
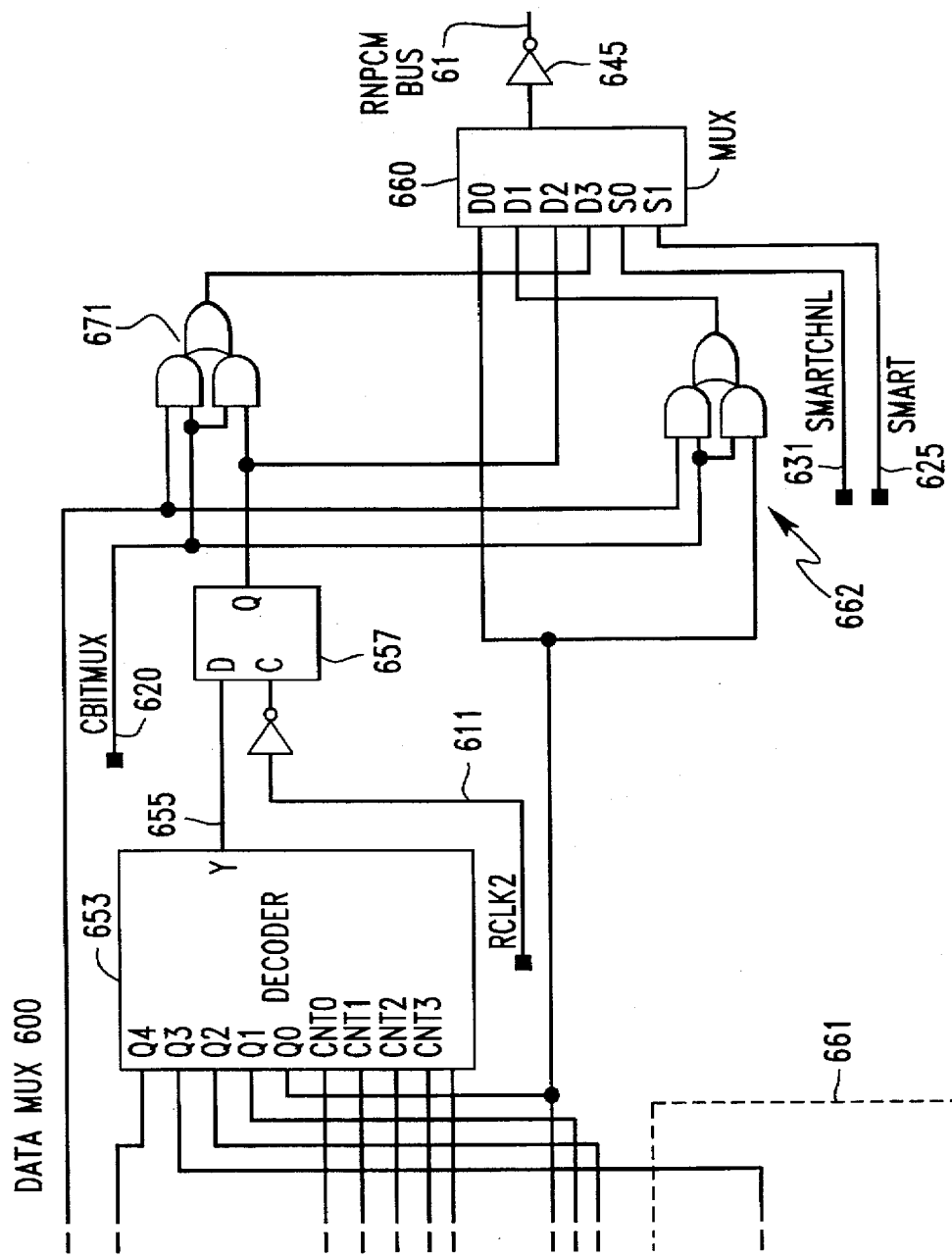

As pointed out previously, information bits of a recovered DS1 data stream are customarily asserted on RPCM line 96 from the output of ESF-to-SF frame converter 93 on the falling edge of the recovered clock signal RCLK, as shown in the timing diagram of FIG. 4, referenced above. However, as will be described in detail below, rather than directly connect RNPCM bus 61 to the output of ESF-to-SF frame converter 93, so that successively produced information bits would be directly clocked out onto RNPCM bus 61, in accordance with the present invention, each end of RNPCM bus 61 is terminated by way of a controllably tri-stated multiplexer (mux), one of which is shown in FIG. 6 as a data multiplexer 600 (a detailed configuration of which is shown in FIGS. 7A and 7B, to be described) which allows the RNPCM bus 61 to be employed as a bidirectional communication link between the LIU 12 and the channel units 18.

As will be described, the time division multiplex format of this bidirectional signalling capability of the RNPCM bus 61 is such that, for the RNPCM INIT mode, during one or more timeslots associated with associated destination channel units, outgoing information bits b1–b8 from the LIU are controllably multiplexed with an additional command Crx bit of which a command message intended for a respective destination channel unit is formed. In addition, for the RNPCM SMART mode, outgoing information bits b1–b8 from the LIU are multiplexed with the additional command Crx bit, the response Ctx bit from the interrogated channel unit, and the extended duration yellow alarm bit $b_{YA}$.

Respective transmit data TPCM and transmit clock TCLK lines 51 and 53 are coupled from the transmit unit 35 to a DS1 SF framer 603, to a TPCM monitor unit 605 and to a D4 framer 95. (DS1 SF framer 603 and TPCM monitor unit 605 form part of the modification of a line interface unit in accordance with the present invention, to be described.) DS1 SF framer 603 is comprised of combinational logic that processes the contents TPCM link 51 and RCLK line 53 to supply a FRAMESYNC signal on line 606 and a SLOT PULSE signal on line 608 to TPCM monitor unit 605.

TPCM monitor unit 605 is comprised of a combinational logic circuitry coupled to a microprocessor bus 610 and is operative to select a timeslot to be monitored by a supervisory LIU control processor 110 for in-band messages, a byte at a time, supplied over TPCM bus 51.

Transmit clock line 53 is further coupled to a framer 97, a line encoder 99, and an equalizer 101. Transmit data is asserted on the transmit data bus TPCM 51 in synchronization with the rising edge of a transmit clock TCLK on clock bus 53. D4 framer 95 analyzes the TPCM data on line 51 to determine when the first bit of the first frame of the superframe occurs. The data is coupled over line 103 and a multi-frame control signal is coupled over line 105 to framer 97 within framing/deframing unit 90. The multi-frame control signal on line 105 is aligned with the first bit (bit 1) of frame one of the superframe (SF). Framer 97 uses this multi-frame control signal to determine how to overwrite the SF framing bit with the ESF framing bit in accordance with control data supplied by way of a framing status and control register 111 that has been loaded by microcontroller 110 via a control link 113. Register 111 of framing/deframing unit 90 is used by microcontroller 110 to place framer 97 in a superframe or extended superframe mode of operation. Framing status and control register 111 may also be employed by microcontroller 110 to perform additional signalling protocol control tasks, including controllably inserting an idle code on one or more selected channels, inserting a zero suppression code in a channel with a zero byte code, and provisioning yellow and blue alarm codes, as non-limitative examples.

The resulting framed data is coupled from framer 97 over link 98 through controllable relay loopback interface 85 and link 86 to line encoder 99. Using the transmit clock TCLK on line 53, line encoder 99 encodes the serial data in accordance with required format (e.g. by substituting a bipolar violation sequence for zeros in the case of B8ZS signalling) onto respective transmit positive TPOS and transmit negative TNEG lines 121, 123, in order to form the requisite bipolar signals. Equalizer 101 level-adjusts the bipolar signals and applies the adjusted signals via controllable loopback relay interface 73 to transformer-coupled transmit link pair 14T. The level adjustment effected by equalizer 101 assures that the level of the signals arriving at the far end of the link is at the correct level for the length of cable between sites.

The line interface unit further includes a status and control register unit 125, which stores status and control information relating to the operation of the line interface unit. Register unit 125 is accessed via bus 113 from microcontroller 110. As non-limitative examples of its use, register unit 125 may store a prescribed equalization level, monitor a loss of signal indication and monitor whether the transmitter is meeting a prescribed transmission specification.

The incorporation of additional circuitry (shown in double lines in FIG. 6), through which the functionality of the line interface unit is enhanced to provide bidirectional signalling capability for facilitating performance monitoring of the DS0 loop, will now be described. As noted earlier, in the LIU 12 of a conventional D4 channel bank, DS1 data that has been deframed from the T1 link is normally asserted output directly from ESF-to-SF frame bit converter 93 to RNPCM bus 61 on the falling edge of the recovered clock signal RCLK, as RNPCM bus 61 is customarily employed for unidirectional signalling, carrying only DS1 data traffic from the LIU to an OCU-DP.

As pointed out above, in accordance with the invention, rather than connect bus 61 directly to the output of ESF-to- SF frame converter 93, the LIU end of RNPCM bus 61 is terminated by way of controllably tri-stated data multiplexer 600. Data multiplexer 600 is further coupled to receive an RFRAME signal on line 94 from ESF-to-SF frame converter 93'. The other end of RNPCM bus 61 is similarly tri-state terminated via a respective multiplexer at the OCU-DP 18, so that RNPCM bus 61 may operate as a bidirectional communication link between LIU 12 and an OCU-DP 18. Data multiplexer 600 is coupled to each of RCLK line 76 and an output line 611 from an RCLK doubler 613, which is coupled to RCLK line 76 and is operative to output a clock signal RCLK2 at twice the clock rate of the RCLK signal on line 76. RLCK doubler 613 is comprised of a set of combinational logic and flip-flop divider circuitry that is referenced to a high speed signal HSCLK supplied over line 615 from a high speed clock source 617.

In addition to receiving the RPCM data on link 96 from frame converter 93 as an input, data multiplexer 600 is coupled to lines 621, 622 and 623, to which a yellow alarm logic level, a broadcast logic level and a command bit are respectively applied. The yellow alarm logic level signal and the broadcast logic level signal are supplied by control processor 110. The command or Crx bit is supplied by a performance monitoring byte transmit logic circuit 624, which is coupled to the RFRAME link 94 and processor bus 610, through which control processor 110 provides control signals to the auxiliary 'smart' control circuitry of the LIU. Performance monitoring byte transmit logic circuit 624 is comprised of combination logic and storage register circuits and is operative to assemble respective command bit bytes (having the start bit, eight bit command byte and stop bit format shown in FIG. 5, referenced above) and to assert these bytes on the CBITOUT line 623.

Steering control inputs to the data multiplexer 600 include a 'smart' control input supplied over a SMART control line 625 from a smart timeslot discriminator 627, and a smart channel control input supplied over a SMARTCHNL control line 631 from a performance-monitoring channel selector 633. Timeslot discriminator 627 comprises a set of combinational logic and flip-flops, controlled by a timeslot count signal supplied over line 635 by a timeslot identifier 637. Timeslot identifier 637 comprises a controlled counter, which is coupled to receive the RCLK signal supplied on line 76 and the RFRAME signal supplied on line 94 from converter 93, and sequentially steps through the time slots TS1–TS24 associated with the channel units of a di-group, providing successive timeslot identification signals on line 635 and a timeslot pulse one line 639. Timeslot discriminator 627 is coupled to microprocessor bus 610, through which control processor 110 provides control signals to the auxiliary 'smart' control circuitry of the LIU. Via bus 610, timeslot discriminator 627 is informed as to which time slots are associated with 'smart' performance-monitoring channel units, for which the modified or speeded up data mode shown in FIG. 4 is employed. Thus, for a respective timeslot TSi associated with a smart channel unit, smart timeslot discriminator 627 will supply a SMART timeslot output signal on link 625 to data multliplexer 600, so that the data format of a normal data byte on RNPCM bus 61 will be modified to that shown in FIG. 4.

Associated with the SMART timeslot signal on link 625 is the SMARTCHNL control signal on line 631 from performance-monitoring channel selector 633. Like timeslot discriminator 627, PM channel selector 633 is comprised of combinational logic circuitry and is controlled by the timeslot count signal supplied over line 635 by a timeslot identifier 637. PM channel selector 633 is also coupled to processor bus 610, through which the control processor instructs the LIU to which smart channel unit a message packet is to be sent. For any channel unit that is not to receive a command message from the LIU, stop bits are continuously output by the data multiplexer 600.

The LIU further includes a performance monitoring byte receive control logic circuit 641, which is comprised of combinational logic that decodes the contents of timeslot pulse line 639, SMART control line 625, SMARTCHNL line 631, RCLK line 76, and processor bus 610, and outputs a tristate control signal on a PMENABLE link 643 to the tristate control input 644 of a tristatable bus driver 645 for RNPCM bus 61. The tristate control signal on PMENABLE link 643 normally enables RNPCM bus driver 645 for active transmission of output data bytes from the LIU over the RNPCM bus 61. In the case of a performance monitoring command and response message exchange between the LIU and a destination channel unit, PM byte receive logic 641 is operative to change the logic level state of PMENABLE line 643 during the bit time that a Ctx bit from the interrogated channel unit is expected to be asserted on the RNPCM bus 61, so that driver 645 is disabled from asserting data onto the RNPCM bus 61. As a consequence, the Ctx bit on the RNPCM bus may be read via receive logic circuit 641, so that the Ctx bit may be captured and applied to processor 110.

Referring now to FIG. 7A and 7B, the configuration of controllably tri-stated data multiplexer 600 is shown as comprising a divide-by-sixteen counter 651 to which a frame sync signal RFRAME on line 94 from frame converter 93 and the RCLK2 signal on line 611 from clock doubler 613 are coupled. Divide-by-sixteen counter 651 provides a set of count signals to inputs CNT0–CNT3 of a time slice decoder 653, the output of which on line 655 is coupled to the D input of flip-flop 657, which is clocked by the doubled RCLK signal RCLK2. The Q output of flip-flop 657 is coupled to a D2 input of a 4:1 output multiplexer 660, the output of which is coupled to controllably tristated RNPCM bus driver 645. The steering control inputs to the output multiplexer 660 are the above-referenced a 'smart' control input supplied by SMART control line 625 from smart timeslot discriminator 627, and the smart channel control input supplied over SMARTCHNL control line 631 from performance-monitoring channel selector 633. Time slice decoder 653 comprises combinational logic circuitry which decodes count and data inputs to provide a control logic level to the D input of flip-flop 657. When its D2 input is selected, output multiplexer 660 is operative to apply speeded-up data on RNPCM bus 61.

The RPCM link 96 is coupled through a control gate circuit 658 to the D0 input of output multiplexer 660, to a combinational logic circuit 662 and to a data input of a three bit shift register 661, which is clocked by the RCLK signal on RCLK line 76. When its D0 input is selected, output multiplexer 660 is operative to couple normal RPCM data on link 96 to RNPCM bus 61. Control gate 658 circuit is controllably disabled by a yellow alarm logic level one yellow alarm line 621. Respective stage outputs of shift register 661 are coupled to respective state inputs of time slice decoder 653. Additional inputs to time slice decoder are the yellow alarm logic level supplied over link 621, a broadcast logic level supplied over link 622, and the Crx bit supplied over CBITOUT line 623 from performance monitoring byte transmit logic circuit 624.

The three bit length of shift register 661 provides for the front end three bit delay of normal bits b1-b2-b3 in the SMART mode of operation, allow for the transmission of a yellow alarm bit $b_{YA}$ during the first two normal bit times b1 and b2, and during the immediately subsequent response bit time b3, when a smart channel unit is allowed to transmit response data on the RNPCM bus 61 by asserting a Ctx bit during the normal bit time b3, as described above with reference to FIG. 4.

When a yellow alarm condition has been determined by the LIU, control gate circuit 658 is disabled by a yellow alarm logic level on line 621, which prevents RPCM data from being input to shift register 661. Instead, the yellow alarm input to time slot slice decoder 653 is decoded to a low logic level applied to the D2 input of output multiplexer 660 during the normal bit times b1 and b2, as shown in FIG. 4.

Combinational logic circuit 662 is further coupled to receive the Crx bit signal on CBITOUT line 623 and a CBITMUX control signal on line 620. The output of combinational logic circuit 662 is coupled to the D1 input of output multiplexer 660. When its D1 input is selected, output multiplexer 660 is being used in the INIT mode and is operative to couple the combined normal data and the command Crx bit format, shown at RNPCM INIT in FIG. 4 at its output on the RNPCM bus 61.

A further combinational logic circuit 671 is coupled to receive the Crx bit signal on CBITOUT line 623, the CBITMUX control signal on line 620, and the Q output of flip-flop 657. The output of combinational logic circuit 671 is coupled to the D3 input of output multiplexer 660. When its D3 input is selected, output multiplexer 660 is being used in the SMART mode and is operative to couple the combined speeded-up data and the command Crx bit format shown at RNPCM SMART in FIG. 4 at its output on the RNPCM bus 61.

Figure 8:
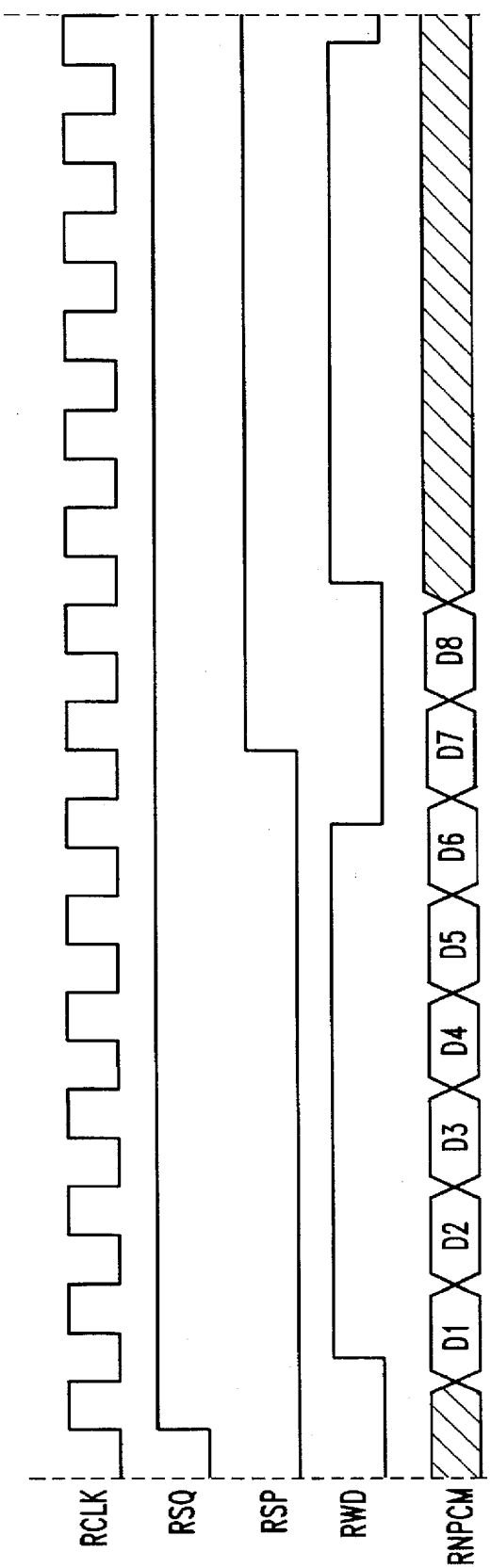
FIG. 8 is a timing diagram showing the PCM 'receive' interface of a standard D4 channel bank consisting of five signals: RSQ, RSP, RWD, RCLK, and RNPCM.

The manner in which a channel unit 18 a conventional AT&T compatible D4 channel bank may be modified into a 'smart' performance-monitoring channel unit in accordance with the present invention will now be described with reference to FIGS. 8–18. As shown in FIG. 8, the PCM 'receive' interface of a standard D4 channel bank consists of five signals: RSQ, RSP, RWD, RCLK, and RNPCM. As described above, with reference to FIG. 2, the RNPCM and RCLK signals are conveyed over respective links 61 and 63 from the LIU 12 to the channel unit 18. The additional three signals shown in FIG. 8 are conveyed by control link RX_CNTL from the receive unit 34 to the channel unit.

Because of the frame bit in the RNPCM stream, the RSQ signal stays "high" for 49 cycles of the RCLK signal in timeslots TS1–TS6 and 48 cycles in timeslots S7–TS24. The RSQ signal then goes low and remains low for 144 cycles of RCLK in slots TS1–TS6, or 145 cycles of RCLK in slots TS7–TS24. The phase relationship between RSQ and RSP will vary depending on the timeslot which the channel unit occupies. For a channel unit that has been modified to provide performance monitoring capability in accordance with the present invention, however, the RNPCM signal on the RNPCM bus 61 is formatted as shown at RNPCM SMART in FIG. 4, described previously.

Figure 10:
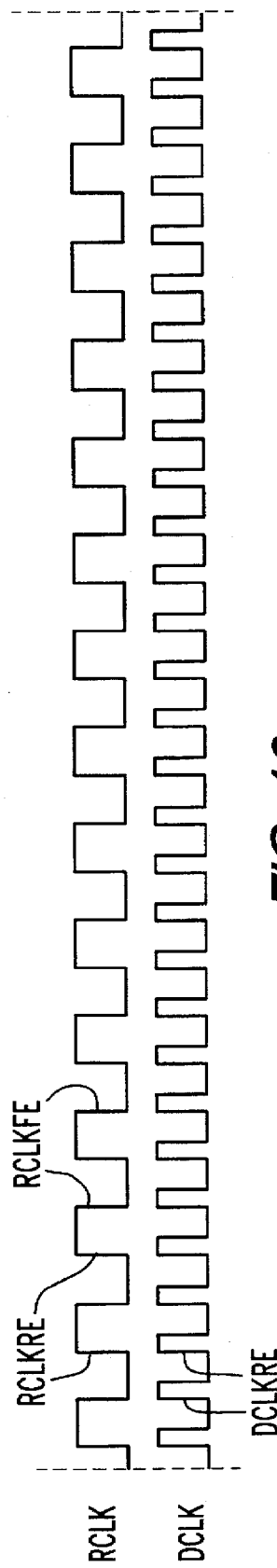
FIG. 10 is a timing diagram associated with the operation of FIG. 9.
Figure 9:
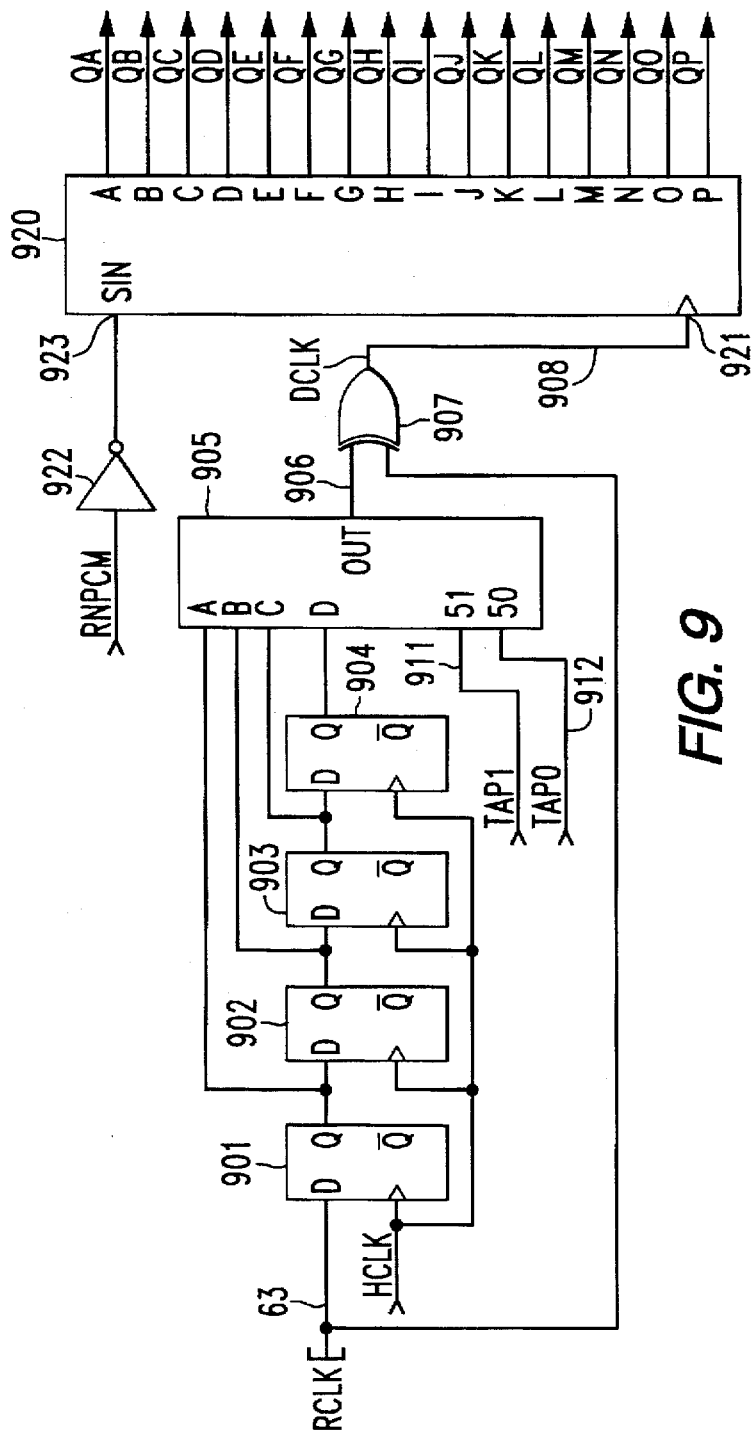
FIG. 9 diagrammatically illustrates clock generator circuitry for generating a DCLK signal, and a shift register into which customer data bits D1–D8 are loaded.

To provide the modified receive data format on the RNPCM bus 61 shown at RNPCM SMART in FIG. 4, the channel unit 18 employs a clock generator circuit shown in FIG. 9 to provide a DCLK signal, which is shown together with the RCLK signal in FIG. 10, as having a rising edge DCLKRE coinciding with each of the successive rising and falling edges RCLKRE and RCLKFE of the RCLK signal on the RCLK bus 63.

This DCLK generator circuit shown in FIG. 9 comprises a set of cascaded register stages 901, 902, 903 and 904, respective Q outputs of which are coupled to a 4:1 multiplexer 905, and is operative to delay the RCLK signal by one, two, three, or four cycles of a high-speed clock signal HCLK, which clocks each register stage. The output of multiplexer 905 is coupled over link 906 to one input of an exclusive-OR circuit 907. A second input of exclusive-OR circuit 907 is coupled to the RCLK line 63. The output of the exclusive-OR circuit 907 provides the DCLK on line 908. The amount of delay is variable to allow for various frequencies of the high speed clock signal HCLK and is selected using select inputs 911 and 912 to the multiplexer 905.

The DCLK output signal on link 908 from the exclusive-OR circuit 907 is coupled to the clock input 921 of a 16-bit shift register 920, and is used to clock in data bits on the RNPCM bus 61 that are coupled through an inverter 922 to the data input 923 of the shift register. Shift register 920 has sixteen outputs QA–QP, as shown.

Figure 11:
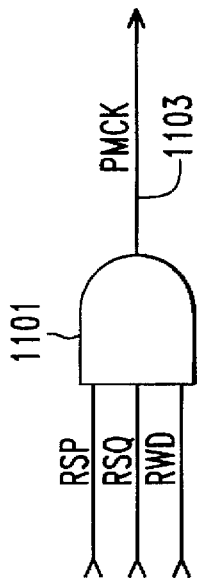
FIG. 11 shows an AND circuit to which the RSP, RSQ and RWD signals of FIG. 8 are applied to obtain a PMCK signal.
Figure 12:
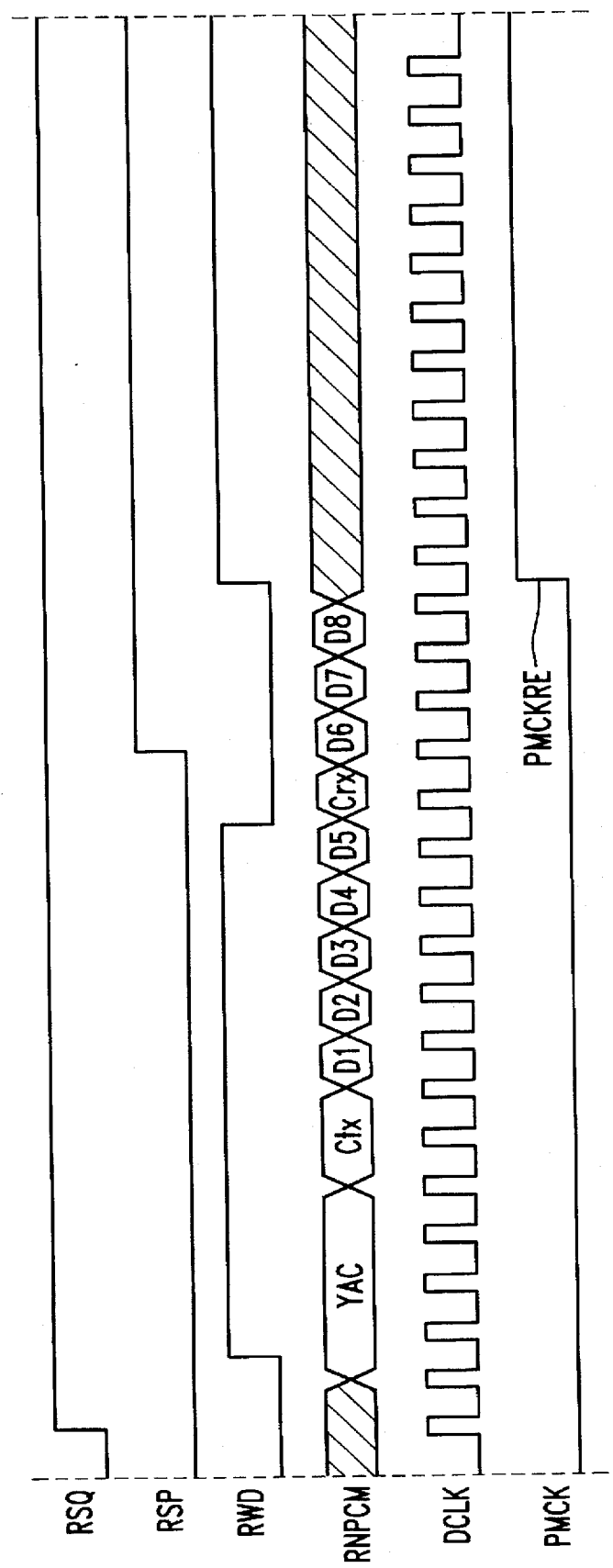
FIG. 12 is a timing diagram showing the relationship of the RNPCM SMART signal of FIG. 4, the RSQ, RSP and RWD signals of FIG. 8, the DCLK signal of FIG. 10 and the PMCK signal produced by the AND circuit 1101 of FIG. 11.

As shown in FIG. 11, the channel unit further includes an And circuit 1101, to which the RSP, RSQ and RWD signals of FIG. 8, referenced above, are applied, and which outputs a PMCK signal on output line 1103. FIG. 12 is a timing diagram showing the relationship of the RNPCM SMART signal of FIG. 4, the RSQ, RSP and RWD signals of FIG. 8, the DCLK signal of FIG. 10 and the PMCK signal produced by the AND circuit 1101 of FIG. 11.

Figure 13:
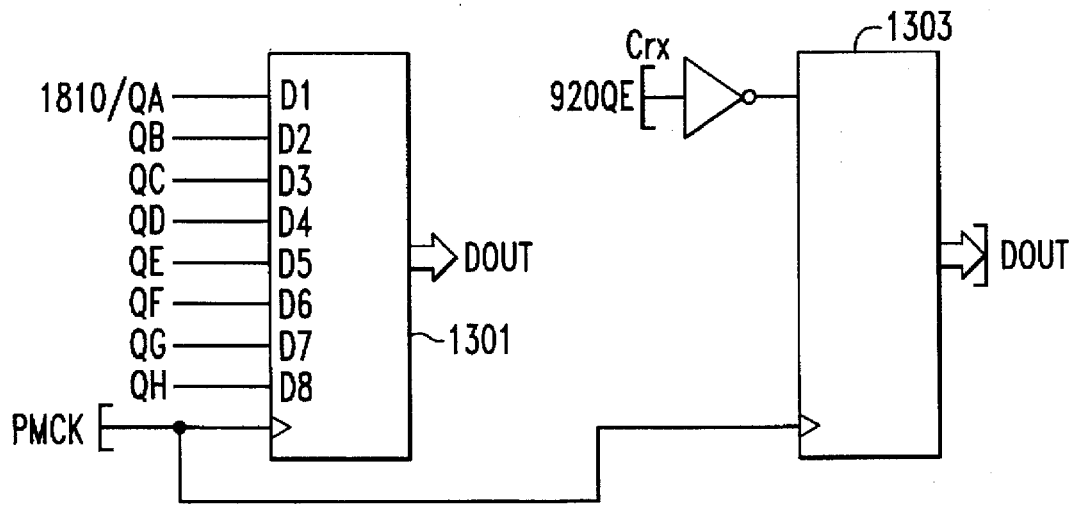
FIG. 13 shows a set of holding registers associated with the storage of data bits and a DS0 performance monitoring communications bit Ctx received from the LIU.

The rising edge PMCKRE of the PMCK clock signal produced by And circuit 1101 is used to load eight received customer data bits (bits D1–D8 in FIG. 8) into a holding register 1301, shown in FIG. 13, and to clock the DS0 performance monitoring communications bit Crx received from the LIU 12 into a shift register 1303. The eight customer data bits D1–D8 are loaded into holding register 1301 from the respective outputs QJ, QI, QH, QG, QF, QD, QC and QB of shift register 920 of FIG. 9 through multiplexer 1810 of FIG. 18, to be described. Similarly, the received DS0 performance monitoring communications bit Crx is loaded from the output QE of the shift register 920.

Figure 14:
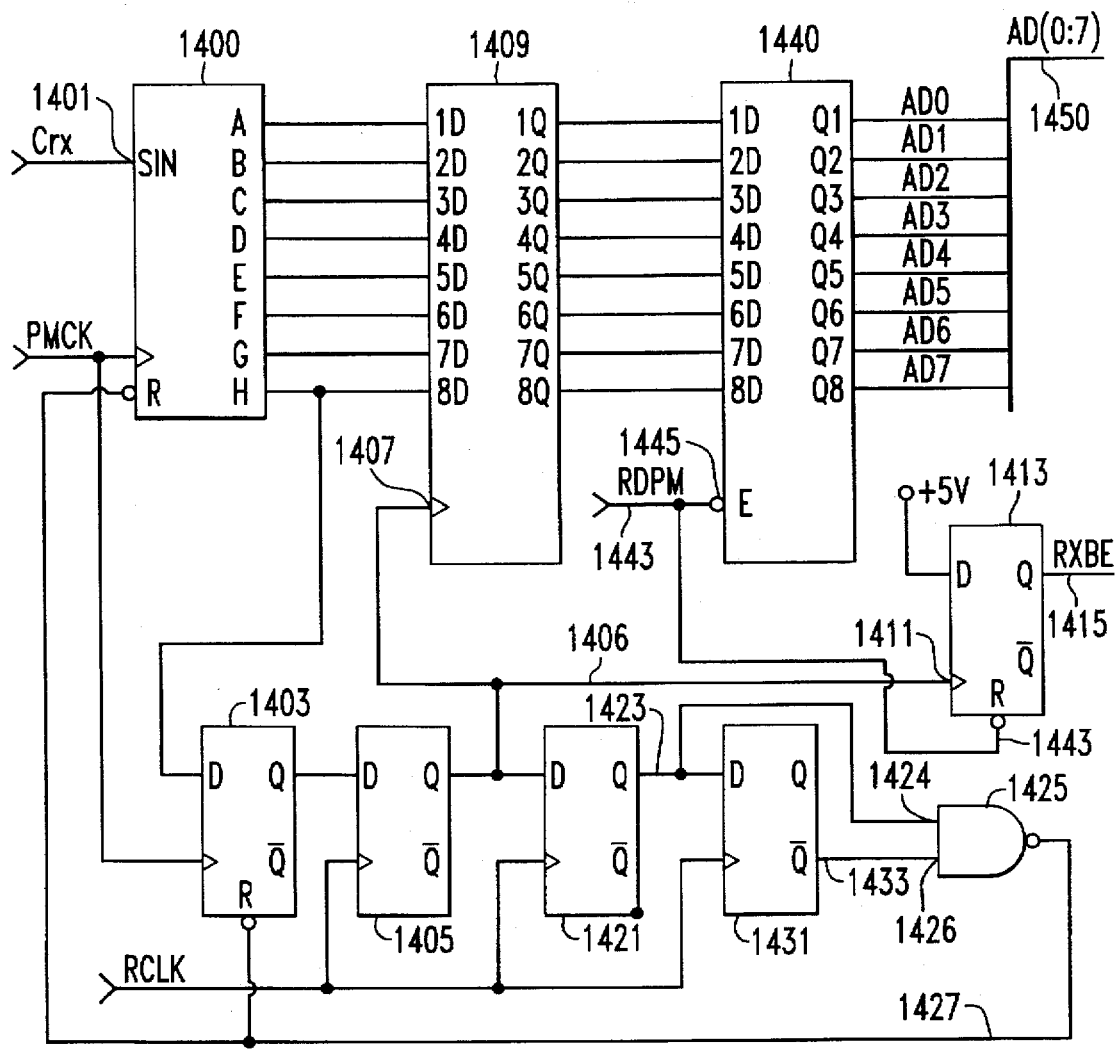
FIG. 14 illustrates the circuitry employed by the performance monitoring capable channel unit to collect Crx bits embedded in the RNPCM SMART data format.

FIG. 14 illustrates the circuitry employed by the performance monitoring capable channel unit to collect Crx bits embedded in the RNPCM SMART data format. As shown therein, the output QE of the shift register 920 is coupled to the shift input port 1401 of a shift register 1400. Shift register 1400 and a D-flip-flop 1403 are clocked by the PMCK clock signal on line 1103 from AND gate 1101. Shift register 1400 and D-flip-flop 1403 are cleared initially.

The performance monitoring communication bits Crx from the LIU 12 are clocked into shift register 1400 on the rising edge PMCKRE of the PMCK signal shown in the timing diagram of FIG. 12, and a bit is shifted out of the H output of shift register 1400 and into D-flip flop 1403 on the same clock rising edge. As will be described in detail below, messages from the LIU 12 are 8-bits in length with two start bits (01) preceding the message.

Since the "0" bit is transmitted first, then when a "1" is clocked into the D flip-flop 1403, the 8 message bits from LIU 12 are stored in and presented to the 8 outputs A–H of shift register 1401. The output of D flip-flop 1403 is clocked into a cascaded D-flip-flop 1405 on the next rising edge RCLKRE of the RCLK signal and causes the Q output of D flip-flop 1405 to change from a "0" to a "1". The low-to-high transition on the Q output of flip-flop 1405 is applied over line 1406 to the clock input 1407 of a holding register 1409, and causes the eight communication bits stored in shift register 1401 to be loaded into holding register 1409. The low-to-high transition on the Q output of flip-flop 1405 is also applied over line 1406 to the clock input 1411 of a flip-flop 1413, so as to clock a '1'(+5V) into flip-flop 1413, so that its output on RXBE line 1415 is a logical '1'. The Q output 1415 of flip-flop 1413 serves as an active-high flag, indicating that 8-bits of received DS0 performance monitoring communication data is waiting to be read by the channel unit's microprocessor (not shown).

On the next rising edge RCLKRE of the RCLK signal, a '1' is clocked into flip-flop 1421, so that a '1' is coupled over link 1423 to a first input 1424 of a NAND gate 1425. The QBAR output of a cascaded flip-flop 1431 is already high at this time since successive '0's had been clocking through the cascaded set of flip-flops 1403, 1405, 1421 and 1431 up to this point. As a consequence, since the QBAR output of flip-flop 1431 is '1' and is applied over line 1433 to a second input 1426 of NAND gate 1425, the output of NAND gate 1425 goes low, and resets shift register 1401 and flip-flop 1403 via reset line 1427, in preparation for the reception of the next message from the LIU 12.

On the next rising-edge RCLKRE of the RCLK signal, a '1' is clocked into flip-flop 1431 from the Q output of flip-flop 1421, which forces its QBAR output low, and the output of NAND gate 1425 high, terminating the low reset level on reset link 1427.

The channel unit's microprocessor reads the stored data through a tri-state buffer 1440, via data bus 1450, by asserting a low (0) logic level on RDPM input link 1443 to its Enable input 1445. In response to this asserted low logic level, the tri-state buffer 1450 places the eight received data bits that are applied to its inputs from the 1Q–8Q outputs of holding register 1409 on the respective AD0–AD7 bit positions of the microprocessor's A/D bus 1450. The '0' logic level transition on RDPM link 1443 also resets flip-flop 1413, causing its Q output on link 1415 to go low, and thus resets the active high flag, indicating that no new message has been received.

Figure 15:
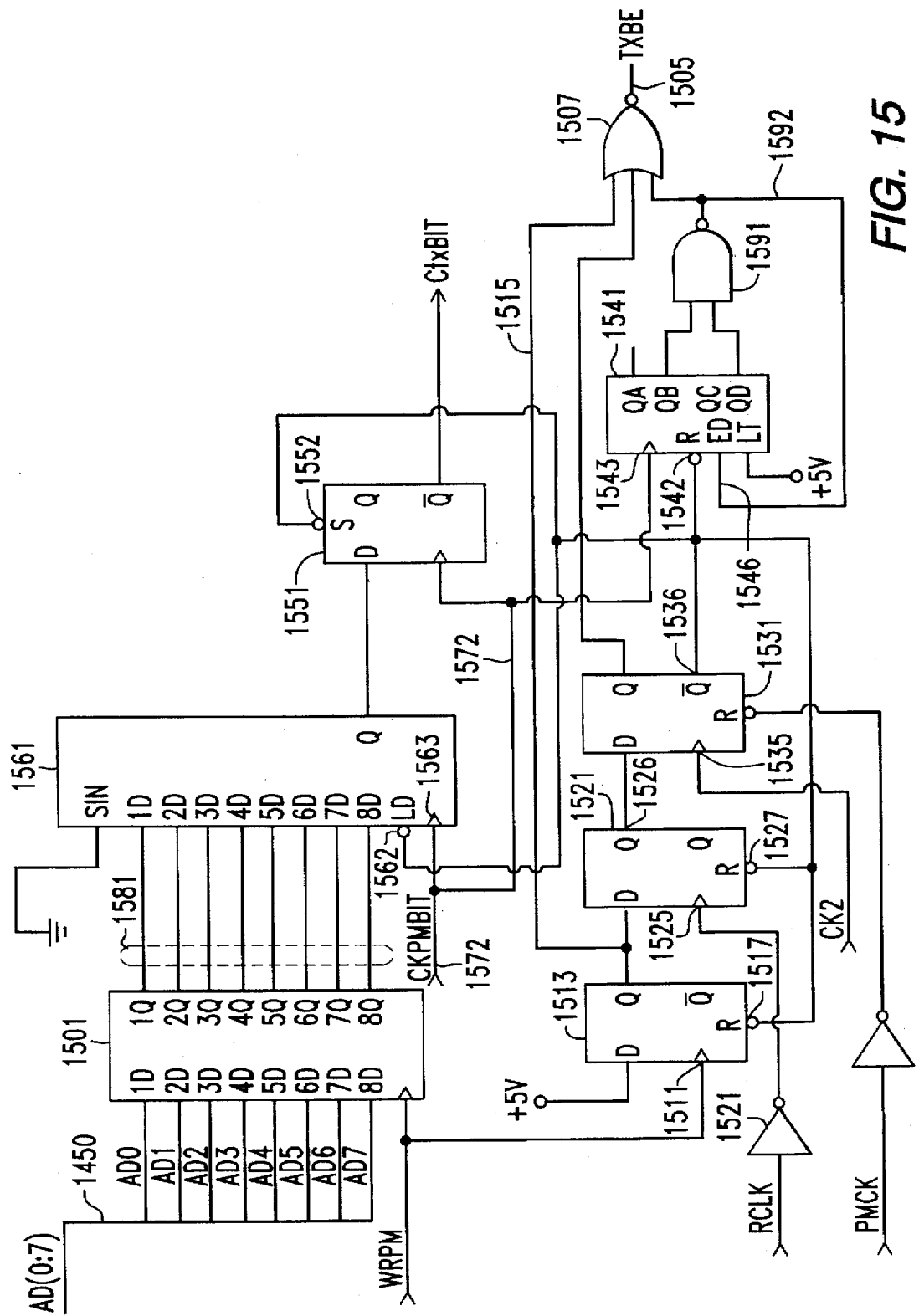
FIG. 15 shows storage and control logic circuitry associated with the assembly and transmission of DS0 performance monitoring data bits to the LIU.

Referring now to FIG. 15, DS0 performance monitoring data bits to be transmitted to the LIU 12 (the bit CTX in FIGS. 4 and 12) are coupled via data bus 1450 to the respective data bit inputs D1–D8 of a holding register 1501 by the channel unit's microprocessor. By monitoring the TXBE output of a NOR gate 1507 on output line 1505, the channel unit's processor knows when to write data to holding register 1501.

This TXBE signal goes high when the circuit has finished transmitting all the performance monitoring data it has been given. The channel unit's processor executes a write operation by asserting eight data bits to be transmitted on inputs AD0–AD7 of holding register 1501, and then asserting a write performance monitoring (WRPM) clock signal on clock input 1502 low and then high again. The AD0–AD7 bits to be transmitted are latched into holding register 1501 on the low-to-high transition of the WRPM clock signal.

This low-to-high transition of the WRPM clock signal is also coupled to the clock input 1511 of a flip-flop 1513. With the D input of flip-flop 1513 hard-wired to a logical '1' (+5V), the WRPM clock signal clocks a '1' into flip-flop 1513. In turn, the change in logic level on the Q output of flip-flop 1513 is coupled via line 1515 to NOR gate 1507, which immediately forces the TXBE output line 1505 of NOR gate 1507 low. The '1' bit on the Q output line 1515 of flip-flop 1513 is clocked into cascaded flip-flop 1521 on the next falling edge of the RCLK signal which is coupled through inverter 1524 to the clock input 1525 of flip-flop 1521.

The '1' bit on the Q output line 1526 of flip-flop 1521 is clocked into further cascaded flip-flop 1531 on the next rising edge of a CK2 clock signal, which is coupled to the clock input 1535 of flip-flop 1531. (The generation of clock signal CK2 will be described below with reference to FIGS. 16 and 17.) The Q output of flip-flop 1531 transitions to a '1' at this time, so that its QBAR output (transitioning to a '0'), which is coupled via line 1536 to the reset input 1542 of a counter 1541, resets counter 1541. Line 1536 is also coupled to the preset input 1552 of a flip-flop 1551 and to the load LD input 1562 of a shift register 1561, as well as to the reset inputs 1517 and 1527 of flip-flops 1513 and 1521, respectively. The QBAR output of line 1536 forces the load LD input 1562 of shift register 1561 to the active low state. This signal remains low until after the next rising edge of a clock performance monitoring bit signal CKPMBIT (to be described below with reference to FIGS. 16 and 17), on line 1572 applied to the clock input 1563 of input to shift register 1561, which causes the data stored in upstream holding register 1501 to be loaded via the data bit leads of parallel transfer bus 1581 into shift register 1561.

Messages to be transmitted to the LIU 12 consist of the eight data bits stored in shift register 1561 and two start bits (01, where the 0 bit is transmitted first) which precede the message. Presetting flip-flop 1551 at this time ensures the transmission of the '1' start bit. Transmission of the '0' start bit is assured since '0's are clocked through shift register 1561 as data is clocked out, and since counter 1541 allows 10 bits to be transmitted before the TXBE output on line 1505 goes high. This ensures that at least one '0' bit is transmitted between messages.

Figure 17:
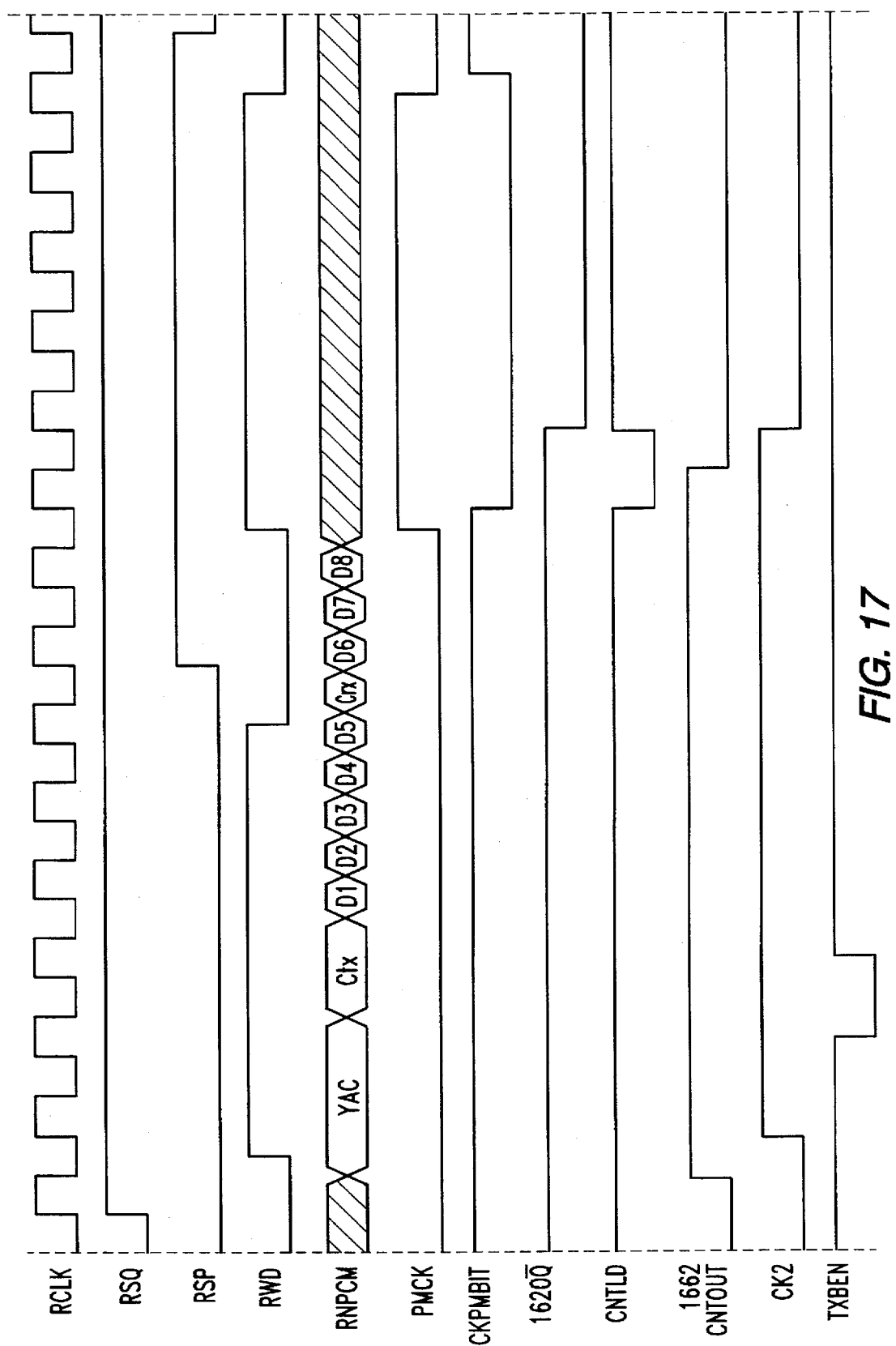
FIG. 17 is a timing diagram associated with the operation of FIG. 16.

After transmission of the two start bits (01), transmission of the eight data bits stored in shift register 1561 takes place as the data bits are clocked through shift register 1561 and flip-flop 1552, the D input of which is coupled to the Q output of shift register 1561, on the rising edge of a clock CKPMBIT signal in FIG. 17, to be described. The CKPMBIT line 1572 is also coupled to the clock input 1543 of counter 1541, so that the rising edge of the CKPMBIT signal clocks counter 1541. When counter 1541 reaches a count of 10 (indicating that the two start bits and eight data bits have been transmitted), its QB and QD outputs are both '1', so that the output 1592 of a NAND gate 1591, the inputs of which are coupled to the QB and QD outputs of counter 1541, is a '0'. The '0' on the output 1592 of NAND gate 1591 is coupled to NOR gate 1507, which forces the TXBE output 1505 of NOR gate 1507 to go high, indicating to the processor that all data has been transmitted. The '0' on output 1592 is also coupled to the enable input 1546 of counter 1541, disabling counter 1541. This ensures that the TXBE output 1505 stays high until the channel unit's processor provides new data to be transmitted.

Figure 16:
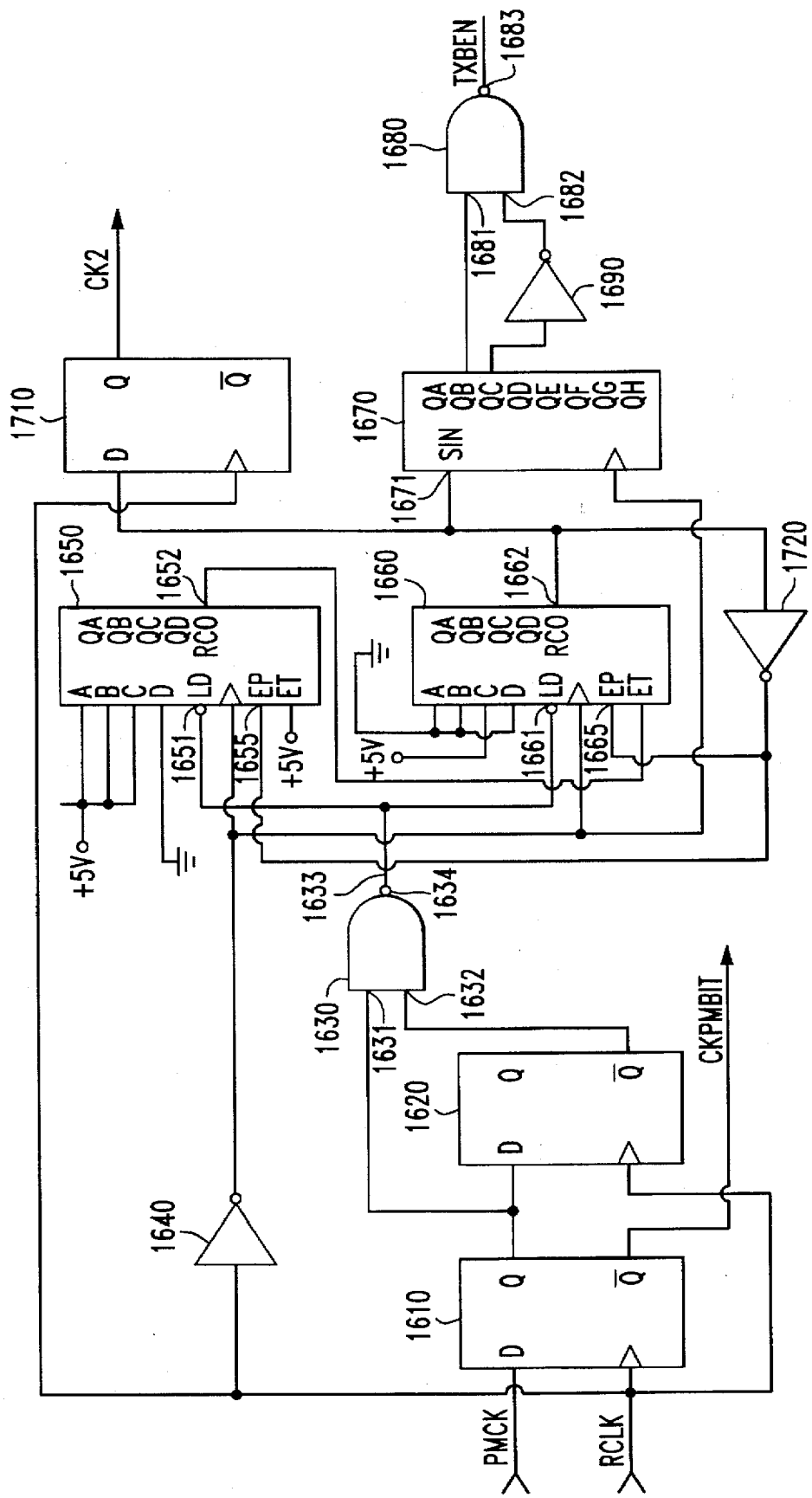
FIG. 16 is a circuit diagram for generating clock signals CKPMBIT and CK2.

The manner in which the clock signals CKPMBIT and CK2 are generated will now be described with reference to the circuit diagram of FIG. 16 and an associated timing diagram shown in FIG. 17. As shown in FIG. 16, the PMCK signal is coupled to the D input of a flip-flop 1610, which is clocked by the RCLK signal. The Q output of flip-flop 1610 is connected to the D input of cascaded flip-flop 1620, which is also clocked by the RCLK signal. The Q output of flip-flop 1610 and the QBAR output of flip-flop 1620 are coupled to the inputs 1631 and 1632 of a NAND gate 1630. The CKPMBIT signal is derived from the QBAR output of flip-flop 1610.

The output 1633 of NAND gate 1630 (which is labelled as a counter load signal CNTLD in the timing diagram of FIG. 17) is coupled over line 1634 to the load LD inputs 1651 and 1661 of respective counters 1650 and 1660. Counters 1650 and 1660 are hardwired via their ABCD inputs to prescribed bit values. The CNTLD signal on line 1634 causes counters 1650 and 1660 to be loaded with their pre-load values on the next falling edge of the RCLK clock signal after the CNTLD signal goes low. A total of 184 cycles later of the RCLK signal, the RCO output 1662 of counter 1660 (labelled as CNTOUT in the timing diagram of FIG. 17) goes high. This CNTOUT signal on line 1662 is coupled to the shift input 1671 of a shift register 1670.

The QB output of shift register 1671 is coupled to a first input 1681 of a NAND gate 1680, a second input 1682 of which is coupled through an inverter 1690 to the QC output of shift register 1670. As a result, the CNTOUT is delayed by two cycles of the RCLK signal by shift register 1670, to produce the low-transitioning output pulse TXBEN at the output 1683 of NAND gate 1680. This TXBEN signal is used to enable the output driver on the RNPCM bus, so that the channel unit 18 can transmit a DS0 performance monitoring communications bit to the LIU 12.

Figure 18:
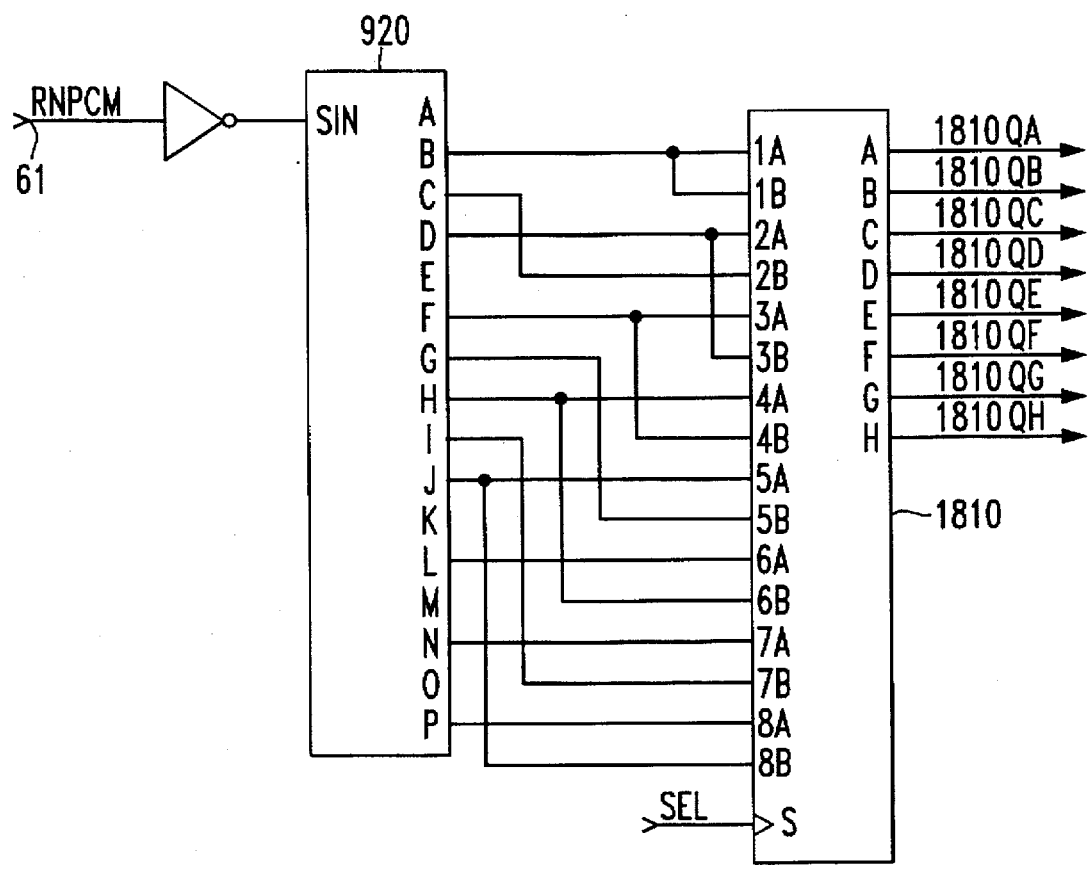
FIG. 18 diagrammaticaly illustrates multiplexer circuitry for use with the circuit of shift register circuit of FIG. 9, where a channel unit does not possess performance monitoring capability.

To generate the CK2 clock signal, the RCLK signal is coupled to the clock input of a flip-flop 1710, the D input of which is coupled via line 1662 to the RCO output of counter 1660. The CK2 signal is derived from the Q output of flip-flop 1710. The RCO output of counter 1660 is further coupled through inverter 1720 to the enable inputs 1655 and 1665 of respective counters 1650 and 1660. Counters 1650 and 1660 and shift register 1670 are clocked by the RCLK signal coupled through inverter 1640.

Where the channel unit does not possess performance monitoring capability, the format on the RNPCM bus is as shown in FIG. 8, referenced above, with eight data bits clocked into the 16-bit shift register 920 shown in FIG. 9. The eight customer data bits (D1–D8) are stored in register stages QP, QN, QL, QJ, QH, QF, QD and QB, respectively. As shown in FIG. 18, these eight outputs of shift register 920 are coupled as inputs to an octal two-line to one-line multiplexer 1810, together with the eight outputs employed to store the D1–D8 data bits, if the channel unit is installed in a channel bank capable of supporting the above-described performance monitoring communications interface. The select input SEL to multiplexer 1810 determines which inputs are connected to the multiplexer's outputs 1810QA–1810QH. Multiplexer 1810 is provisioned according to the type of channel bank in which the channel unit is installed. The data bits (D1–D8) from the outputs of multiplexer 1810 are loaded into holding register 1301 of FIG. 13 on the rising edge of the clock signal PMCK, described above with reference to FIGS. 11 and 12.

OPERATION

Figures 19, 20:
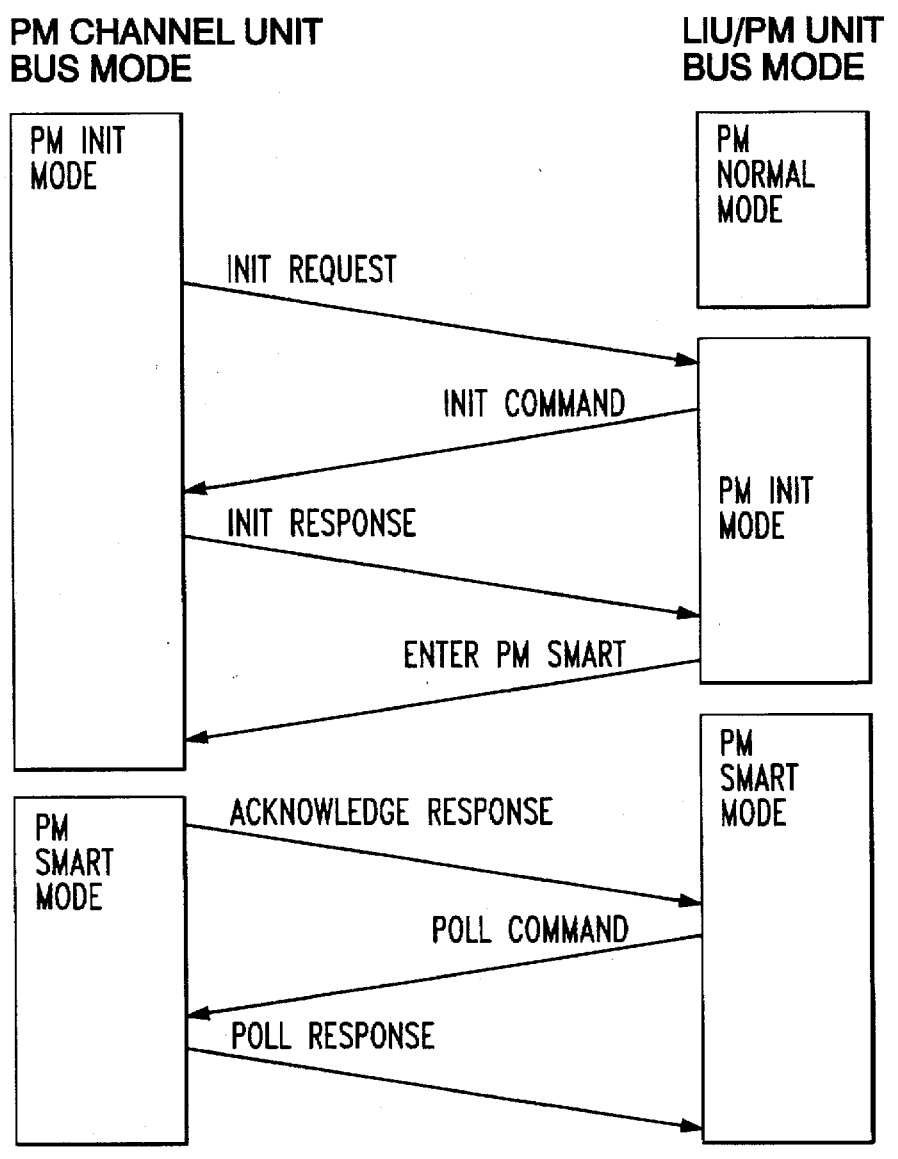
FIG. 19 is a mode transition diagram showing the sequence of message exchanges between a performance monitoring capable channel unit and a performance monitoring capable line interface unit.
FIG. 20 shows the format of an INIT REQUEST message.

The operation of the enhanced performance monitoring mechanism according to the present invention may be understood by reference to the message exchange and mode transition diagram of FIG. 19. When a performance monitoring-capable or 'smart' channel unit is powered up upon being initially installed in a D4 channel bank, it proceeds to transmit an INIT REQUEST message over the TDATA bus 45 to the LIU 12. This INIT REQUEST message is repeatedly asserted on the TDATA bus for a prescribed time-out (e.g. ten seconds) after the expiration of which, the transmission is terminated. This time-out prevents a SMART channel unit from continuously attempting to request initialization from a non-smart LIU. While in the initialization mode, the channel unit disables transmission to the local loop 21.

As a non-limiting example, the format of an INIT REQUEST message may take the form shown in FIG. 20 as comprising a five byte sequence that will not interfere with the T1 framing pattern and contains three unassigned multiplex codes ($18_{Hex}$), followed by two idle control mode codes ($7E_{HEX}$).

The transmit unit 35 couples this initialization sequence over the TPCM lead 51 to the LIU 12, which continuously scans successive timeslots TS1–TS24 for an in-band INIT REQUEST message being transmitted by a SMART channel unit. In response to detecting such an INIT REQUEST message that has been asserted onto the TDATA lead during a respective timeslot TSi, the LIU 12 modifies the normal data format for that timeslot TSi on the RNPCM lead to the RNPCM INIT format shown in FIG. 4, and uses the Crx bit position to transmit an INIT COMMAND data packet on the RNPCM bus 61 to the channel unit that has sourced the INIT REQUEST message.

As a non-limiting example, the format of an INIT COMMAND message may take the form shown in FIG. 21 as comprising a multi-bit sequence of stop bits sufficient to clear the channel. For this purpose, ten successive stop bits (which corresponds to the duration of a standard ten bit command information packet from the LIU consisting of a START bit $b_{START}$, followed by eight data bits $b_{D1}$–$b_{D8}$, and STOP bit $b_{STOP}$ may be transmitted over ten successive frames. The sequential stop bit sequence is followed by a message delimiter byte (F0) and a control field/command opcode ($C1_{HEX}$).

This field is followed by a thirty-bit (four byte) INIT RESPONSE message shown in FIG. 22, in which the eight respective bits of the four bytes correspond to the first bits of thirty-two successive unassigned multiplex codes selected in accordance with a prescribed message generating algorithm employed by the LIU control processor.

After it has asserted an INIT REQUEST message to the LIU on the TDATA lead 45, the channel unit 18 monitors the RNPCM bus 61 and samples the Crx bit position of the RNPCM INIT format of the bus 61 for the return of the INIT COMMAND message from the LIU, formatted as shown in FIGS. C and D, described above. Upon receipt of the INIT COMMAND message from the LIU 12, the channel unit 18 assembles an INIT RESPONSE message which is asserted onto the TDATA bus 45 to the LIU 12. This INIT RESPONSE message corresponds to the same four byte information field contained within the INIT COMMAND message transmitted by the LIU. This mirroring back of the information field in the INIT COMMAND message to the LIU enables the LIU to verify that the destination channel unit is co-located in the same D4 channel bank as the LIU. The channel unit 18 continues to repeatedly assert the four byte INIT RESPONSE information field onto the TDATA bus 45 for a prescribed time interval (one second) or until in receives an ENTER RNPCM SMART mode command message from the LIU.

After asserting an INIT COMMAND message on the RNPCM bus 61, the LIU monitors the TPCM lead 51 from the transmit unit 35 for an INIT RESPONSE message that has been asserted onto the TDATA bus 45 by the channel unit. The LIU examines the contents of the INIT RESPONSE message for the presence of the same thirty-two bit information field contained within the INIT COMMAND message originally transmitted by the LIU, to verify that the channel unit is co-located in the same D4 channel bank as the LIU. If the INIT RESPONSE message is not detected within a prescribed time interval (e.g. 100 milliseconds) after it has transmitted the INIT COMMAND message, the LIU infers that the channel unit is not a SMART channel unit and proceeds to configure the timeslot of interest to normal RNPCM mode and scans the next timeslot.

Assuming that the proper INIT RESPONSE message has been returned by the channel unit, the LIU proceeds to configure data multiplexer 600 for the RNPCM SMART mode, and asserts an ENTER PM SMART mode command message onto the RNPCM bus 61. As a non-limiting example, the format of the ENTER PM SMART mode command message may as shown in FIG. 23, comprising a sequence of a control field/command opcode ($C2_{HEX}$), that follows a delimiter byte (F0) of a previous message, a pair of HDLC CRC bytes and a terminating message delimiter byte (F0).

After it has asserted an INIT RESPONSE message to the LIU on the TDATA lead 45, the channel unit 18 monitors the RNPCM bus 61 and samples the Crx bit position of the RNPCM INIT format of the bus 61 for the return of the ENTER PM SMART message from the LIU. Upon receipt of the ENTER PM SMART command message from the LIU 12, the channel unit 18 transitions to the PM SMART MODE. Upon transitioning to this mode, the channel unit proceeds to reconfigure the TDATA bus 45 for the normal data format, and also asserts an acknowledge (ACK) message onto the RNPCM bus 61, using the bit position customarily occupied by the b3 bit of a normal data format to assert a Ctx bit on the RNPCM bus 61. As a non-limiting example, the format of an ACK message may be constituted as shown in FIG. 24, comprising a control field/command opcode (1000 0010) following a sequence of a message delimiter byte (F0) of a previous message, a pair of HDLC CRC bytes and a terminating message delimiter byte (F0).

Assuming that an ACK message has been asserted onto the RNPCM bus 61 by the channel unit, so that both the LIU and the channel unit are configured for SMART mode message exchanges, the LIU proceeds to conduct asynchronous command and response message communications with the channel unit, using the RNPCM SMART data format of FIG. 4. Return message timeouts are preferably employed by each of the LIU and channel units to avoid either unit from becoming 'stuck' in a waiting condition. If message is not returned within the required timeout, the unit reverts to the normal mode for that time slot.

As will be appreciated from the foregoing description, the present invention involves modifying the data communication format on the RNPCM bus of a D4 channel bank to allow two additional user-transparent, non-normal data communication formats (RNPCM INIT and RNPCM SMART), to be employed for initialization and performance monitoring or 'smart' modes of operation of the channel bank, which facilitate the use of reduced complexity asynchronous-based communication circuitry in the line interface unit (LIU) and channel unit (OCU-DP) equipments, while circumventing the problem of false yellow alarms in the receive unit of the channel bank's commond equipment.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed:

1. For use with a telephone communication network containing a first communication link over which first digital communication signals are conveyed at a first data rate between a first site and a line interface unit of a channel bank at a second site, said channel bank further including a channel unit coupled to said line interface unit by way of a first channel bank link through which said first digital communication signals are conveyed from said line interface unit to said channel unit, said channel unit being operative to transmit said first digital communication signals at a second data rate over a second communication link to a digital communications network interface at a customer site, and to transmit second digital communication signals, that have been conveyed thereto at said second data rate over said second communication link from said digital communications network interface, to said line interface unit by way of a second channel bank link, so that said line interface unit may transmit said second digital communication signals over said first communication link at said first data rate to said first site, a method of conveying command and response message signals between said line interface unit and said channel unit comprising the steps of:

(a) controlling said first channel bank link so as to allow said line interface unit to convey thereover command message signals from said line interface unit to said channel unit, without interrupting the transmission of said first digital communication signals over said first channel bank link; and (b) interleaving a command message signal from said line interface unit to said channel unit between selected successive ones of said first digital communication signals.

2. A method according to claim 1, wherein step (b) comprises interleaving a command message bit from said line interface unit to said channel unit between selected successive bits of a data byte of which said first digital communication signals are comprised, which selected successive bits minimize corruption of an inadvertently sampled voice signal byte, without affecting a bit position employed for the transmission of call establishment control information.

3. A method according to claim 1, further including the step (c) of increasing the data rate of the transmission of said first digital communication signals over said first channel bank link, and transmitting a response message signal from said channel unit to said line interface unit, during a first time interval separate from that occupied by successive bits of a data byte of which increased data rate first digital communication signals are comprised.

4. A method according to claim 3, further including the step (d) of increasing the data rate of the transmission of said first digital communication signals over said first channel bank link, and asserting a yellow alarm code signal onto said first channel bank link, during a second time interval separate from said first time interval and a time interval occupied by successive bits of a data byte of which the increased data rate first digital communication signals are comprised.

5. A method according to claim 1, further including the steps of:

(c) increasing the data rate of the transmission of said first digital communication signals over said first channel bank link; and (d) causing said line interface unit to assert a yellow alarm code signal onto said first channel bank link during a time interval, that is separate from that occupied by successive bits of a data byte of which increased data rate first digital communication signals are comprised.

6. A method according to claim 5, wherein step (d) comprises causing said line interface unit to assert said yellow alarm code signal onto said first channel bank link during a time interval that includes the second data bit of a normal data byte, of which first digital communication signals conveyed over said first channel bank at their normal data rate are comprised.

7. A method according to claim 5, wherein step (d) comprises causing said line interface unit to assert said yellow alarm code signal onto said first channel bank link during a time interval that includes the first and second data bits of a normal data byte, of which first digital communication signals conveyed over said first channel bank link at their normal data rate are comprised.

8. A method according to claim 5, wherein step (d) comprises causing said line interface unit to assert said yellow alarm code signal as being representative of the occurrence of a yellow alarm condition, only in response to detecting the presence of a yellow alarm condition signal in each of a plurality of first digital communication signals, respectively associated with each of a plurality of channel units of said channel bank, conveyed from said first site to said line interface unit.

9. For use with a telephone communication network containing a first communication link over which first digital communication signals are conveyed at a first data rate between a first site and a line interface unit of a channel bank at a second site, said channel bank further including a plurality of channel units coupled to said line interface unit by way of a first time division multiplexed channel bank link through which said first digital communication signals are conveyed from said line interface unit to respective ones of said channel units, a respective channel unit being operative to transmit said first digital communication signals at a second data rate over a second communication link to a digital communications network interface at a customer site, and to transmit second digital communication signals, that have been conveyed thereto at said second data rate over said second communication link from said digital communications network interface, to said line interface unit by way of a second time division multiplex channel bank link, so that said line interface unit may transmit said second digital communication signals over said first communication link at said first data rate to said first site, a method of asserting a yellow alarm message onto said first channel bank link to a channel bank receive unit coupled thereto, said method comprising the steps of:

(a) transmitting said first digital communication signals over said first channel bank link at a data rate that is increased relative to the normal data rate at which first digital communication signals are transmitted over said first channel bank link; and (b) causing said line interface unit to assert a yellow alarm code signal onto said first channel bank link during a first portion of a respective channel unit time slot in which increased data rate first digital communication signals are transmitted, said first portion being separate from a second portion of said respective channel unit time slot containing successive ones of said increased data rate first digital communication signals.

10. A method according to claim 9, wherein said first portion of said respective channel unit time slot includes a second data bit of a normal data byte of which first digital communication signals conveyed over said first channel bank at their normal data rate are comprised.

11. A method according to claim 9, wherein said first portion of said respective channel unit time slot corresponds to first and second data bits of a normal data byte of which first digital communication signals conveyed over said first channel bank link at their normal data rate are comprised.

12. A method according to claim 9, wherein step (b) comprises causing said line interface unit to assert said yellow alarm code signal as being representative of the occurrence of a yellow alarm condition, only in response to detecting the presence of a yellow alarm condition signal in each of a plurality of first digital communication signals, respectively associated with each of said plurality of channel units of said channel bank, conveyed from said first site to said line interface unit.

13. For use with a telephone communication network containing a first communication link over which first digital communication signals are conveyed at a first data rate between a first site and a line interface unit of a channel bank at a second site, said channel bank further including a channel unit coupled to said line interface unit by way of a first channel bank link through which said first digital communication signals are conveyed from said line interface unit to said channel unit, said channel unit being operative to transmit said first digital communication signals at a second data rate over a second communication link to a digital communications network interface at a customer site, and to transmit second digital communication signals, that have been conveyed thereto at said second data rate over said second communication link from said digital communications network interface, to said line interface unit by way of a second channel bank link, so that said line interface unit may transmit said second digital communication signals over said first communication link at said first data rate to said first site, a method of conveying command and response message signals between said line interface unit and said channel unit comprising the steps of:

(a) during a first mode of operation, modifying the data communication format of said first channel bank link to provide for the insertion of an auxiliary command signal between selected portions of said first digital communication signals, and transmitting command information to a channel unit by way of said auxiliary command signal; and (b) during a second mode of operation, modifying the communication format on said first channel bank link to provide for the transmission of said first digital communication signals at a data rate that is increased relative to the normal data rate at which first digital communication signals are transmitted over said first channel bank link, and transmitting a response message signal from said channel unit to said line interface unit during a first time interval separate from that occupied by said increased data rate first digital communication signals.

14. A method according to claim 13, wherein step (b) further comprises causing said line interface unit to assert a yellow alarm code signal onto Said first channel bank link during a second time interval, separate from said first time interval and separate from a third time interval occupied by successive ones of said increased data rate first digital communication signals.

15. A method according to claim 13, wherein step (b) comprises modifying the communication format on said first channel bank link, so as to shorten the duration of successive data bits of a data byte of which said first communication signals are comprised, to a reduced time interval that provides for the insertion of additional information bits within the remaining available portion of the normal data byte period, said additional information bits including a command bit from said line interface unit to said channel unit, a response bit from said channel unit to said line interface unit and a yellow alarm bit.

16. A method according to claim 15, wherein step (b) comprises modifying the communication format on said first channel bank link, such that said yellow alarm bit occupies the first two normal data bits of said normal data byte period.

17. A method according to claim 15, wherein step (b) comprises modifying the communication format on said first channel bank link, such that said response bit from said channel unit immediately follows said yellow alarm bit.

18. A method according to claim 15, wherein step (b) comprises modifying the communication format on said first channel bank link, so as to effectively halve the duration of successive data bits of a data byte of which said first communication signals are comprised, such that successive ones of compressed data bits and said command bit may be sampled by a respective successive edge of a sampling clock signal having a clock rate that is twice that of said normal data rate.

19. A method according to claim 13, wherein step (a) comprises, during said first mode of operation, modifying the data communication format of said first channel bank link to provide for the insertion of an auxiliary command signal between selected portions of said first digital communication signals, and transmitting command information to a channel unit by way of said auxiliary command signal as an initialization command message to said channel unit.

20. A method according to claim 19, wherein step (a) comprises initiating said first mode of operation, in response to said channel unit having transmitted an initialization request message to said line interface unit over said second channel bank link.

21. A method according to claim 19, wherein step (a) comprises, at said channel unit, monitoring said first channel bank link for said initialization command message and, in response to detecting said initialization command message, transmitting an initialization response message over said second channel bank link to said line interface unit, said initialization response message containing information carried by said initialization command message, so as to enable said line interface unit that said channel unit has received said initialization command message.

22. A method according to claim 21, wherein step (b) includes establishing said second mode of operation in response to detecting said initialization response message, and transmitting a command message instructing said channel unit to enter said second mode of operation.

23. A method according to claim 22, wherein step (b) further includes, in response to detecting a command message which instructs said channel unit to enter said second mode of operation, transmitting an acknowledgement message signal from said channel unit to said line interface unit, and thereafter causing said line interface unit to conduct asynchronous command and response message communications with said channel unit.

24. For use with a telephone communication network containing a first communication link over which first digital communication signals are conveyed at a first data rate between a first site and a line interface unit of a channel bank at a second site, said channel bank further including a channel unit coupled to said line interface unit by way of a first channel bank link, through which said first digital communication signals are conveyed from said line interface unit to said channel unit, said channel unit being operative to transmit said first digital communication signals at a second data rate over a second communication link to a digital communications network interface unit at a customer site, and to transmit second digital communication signals, that have been conveyed thereto at said second data rate over said second communication link from said digital communications network interface unit, to said line interface unit by way of a second channel bank link, so that said line interface unit may transmit said second digital communication signals over said first communication link at said first data rate to said first site, an arrangement for conducting auxiliary in-band communications between said line interface unit and said channel unit without interrupting transmission of said first digital communication signals over said first channel bank link comprising:

in said line interface unit, a first multiplexer unit, which is coupled to said first channel bank link, and is operative to controllably transmit command message signals from said line interface unit over said first channel bank link to said channel unit, between selected successive ones of said first digital communication signals, such that said command message signals do not interfere with the transmission of said first digital communication signals over said first channel bank link; and in said channel unit, a second multiplexer unit, which is coupled to said first channel bank link, and is operative to monitor said first channel bank for said command message signals that have been inserted between said selected successive ones of said first digital communication signals.

25. An arrangement according to claim 24, wherein said second multiplexer unit is operative to increase the data rate of the transmission of said first digital communication signals over said first channel bank link, and to transmit a response message signal from said channel unit to said line interface unit, during a first time interval separate from that occupied by successive bits of a data byte of which increased data rate first digital communication signals are comprised.

26. An arrangement according to claim 25, wherein said first multiplexer unit is operative to interleave a command message bit at a time occurrence located between said selected successive bits of a data byte of which said first digital communication signals are comprised, said selected successive bits minimizing corruption of an inadvertently sampled voice signal byte, without affecting a bit position employed for the transmission of call establishment control information.

27. An arrangement according to claim 24, wherein said second multiplexer unit is operative increase the data rate of the transmission of said first digital communication signals over said first channel bank link, and wherein said first multiplexer unit is operative to assert a yellow alarm code signal onto said first channel bank link, during a second time interval that is separate from said first time interval and is separate from a time interval occupied by successive bits of a data byte of which the increased data rate first digital communication signals are comprised.

28. An arrangement according to claim 27, wherein said first multiplexer is operative to assert said yellow alarm code signal onto said first channel bank link, during a time interval that includes the second data bit of a normal data byte, of which first digital communication signals conveyed over said first channel bank at their normal data rate are comprised.

29. An arrangement according to claim 27, wherein said first multiplexer is operative to assert said yellow alarm code signal onto said first channel bank link, during a time interval that includes the first and second data bits of a normal data byte, of which first digital communication signals conveyed over said first channel bank link at their normal data rate are comprised.

30. An arrangement according to claim 27, wherein said first multiplexer is operative to assert said yellow alarm code signal as being representative of the occurrence of a yellow alarm condition, only in response to said line interface unit detecting the presence of a yellow alarm condition signal in each of a plurality of first digital communication signals, respectively associated with each of a plurality of channel units of said channel bank, conveyed from said first site to said line interface unit.

31. For use with a telephone communication network containing a first communication link over which first digital communication signals are conveyed at a first data rate between a first site and a line interface unit of a channel bank at a second site, said channel bank further including a plurality of channel units coupled to said line interface unit by way of a first time division multiplexed channel bank link through which said first digital communication signals are conveyed from said line interface unit to respective ones of said channel units, a respective channel unit being operative to transmit said first digital communication signals at a second data rate over a second communication link to a digital communications network interface at a customer site, and to transmit second digital communication signals, that have been conveyed thereto at said second data rate over said second communication link from said digital communications network interface, to said line interface unit by way of a second time division multiplex channel bank link, so that said line interface unit may transmit said second digital communication signals over said first communication link at said first data rate to said first site, an arrangement installed in said line interface unit for controllably asserting a yellow alarm message onto said first channel bank link, said arrangement comprising a first multiplexer unit, which is coupled to said first channel bank link, and is operative to controllably transmit said first digital communication signals over said first channel bank link, and a first multiplexer control unit which is operative to cause said first multiplexer to transmit said first digital communication signals at a data rate that is increased relative to the normal data rate at which first digital communication signals are transmitted over said first channel bank link, and to controllably assert a yellow alarm code signal onto said first channel bank link, during a first portion of a respective channel unit time slot in which increased data rate first digital communication signals are transmitted, said first portion being separate from a second portion of said respective channel unit time slot containing successive ones of said increased data rate first digital communication signals.

32. An arrangement according to claim 31, wherein said first portion of said respective channel unit time slot includes a second data bit of a normal data byte of which said first digital communication signals conveyed over said first channel bank at their normal data rate are comprised.

33. An arrangement according to claim 31, wherein said first portion of said respective channel unit time slot corresponds to first and second data bits of a normal data byte of which first digital communication signals conveyed over said first channel bank link at their normal data rate are comprised.

34. An arrangement according to claim 31, wherein said first multiplexer control unit is operative to cause said first multiplexer to assert said yellow alarm code signal as being representative of the occurrence of a yellow alarm condition, only in response to detecting the presence of a yellow alarm condition signal in each of a plurality of first digital communication signals, respectively associated with each of said plurality of channel units of said channel bank, conveyed from said first site to said line interface unit.

35. An arrangement according to claim 31, wherein said first multiplexer control unit is operative to cause said first multiplexer to transmit command message signals over said first channel bank link to said channel unit, between selected successive ones of the increased data rate first digital communication signals such that said command message signals do not interfere with the transmission of said increased data rate first digital communication signals over said first channel bank link, and further including, in said channel unit, a second multiplexer unit, which is coupled to said first channel bank link, and is operative to monitor said first channel bank for said command message signals that have been inserted between said selected successive ones of said first digital communication signals.

\* \* \* \* \*